(12) United States Patent
Maruyama et al.

(10) Patent No.: US 6,807,018 B2
(45) Date of Patent: Oct. 19, 2004

(54) OBJECTIVE LENS FOR OPTICAL PICK-UP

(75) Inventors: Koichi Maruyama, Tokyo (JP);
Takashi Yamanouchi, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/402,932

(22) Filed: Apr. 1, 2003

(65) Prior Publication Data
US 2003/0189772 A1 Oct. 9, 2003

(30) Foreign Application Priority Data
Apr. 2, 2002 (JP) ........................ 2002-100398

(51) Int. Cl.[7] .......................... G02B 3/02; G02B 13/18; G11B 7/00; G11B 7/135
(52) U.S. Cl. ................. 359/719; 359/708; 369/44.23; 369/112.23
(58) Field of Search ................. 359/719, 641, 359/668, 670, 708, 711, 724, 742, 743; 369/44.32, 44.23, 44.21, 44.37, 112.03, 112.05–112.07, 112.23

(56) References Cited
U.S. PATENT DOCUMENTS 5,726,436 A * 3/1998 Oka et al. ............... 369/44.23
5,754,504 A    5/1998 Yamazaki et al.
6,304,526 B1 * 10/2001 Nagashima et al. ..... 369/44.23
6,477,129 B2   11/2002 Maruyama et al.

FOREIGN PATENT DOCUMENTS

JP        1153759        2/1999

OTHER PUBLICATIONS

English Language Abstract of JP Appln. No. 11–53759.

* cited by examiner

Primary Examiner—Georgia Epps
Assistant Examiner—Alicia M. Harrington
(74) Attorney, Agent, or Firm—Greenblum & Bernstein, P.L.C.

(57) ABSTRACT

An objective lens of an optical pick-up is formed to provide axial astigmatism corresponding to wavefront aberration of $0.01\lambda$ [rms] or more when a shorter wavelength laser beam emitted by a first laser diode is converged on a first optical disc, and to provide coma so that its sign when the shorter wavelength laser beam is converged on the first optical disc will be opposite to its sign when a longer wavelength laser beam emitted by a second laser diode is converged on a second optical disc.

19 Claims, 18 Drawing Sheets

FIG. 3A
FIG. 3B  FIG. 3C
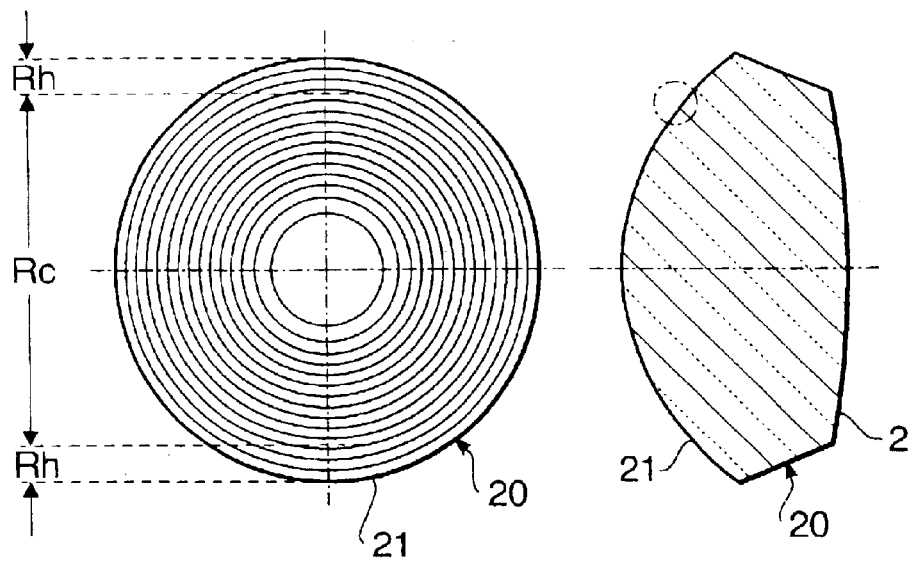
FIG. 4
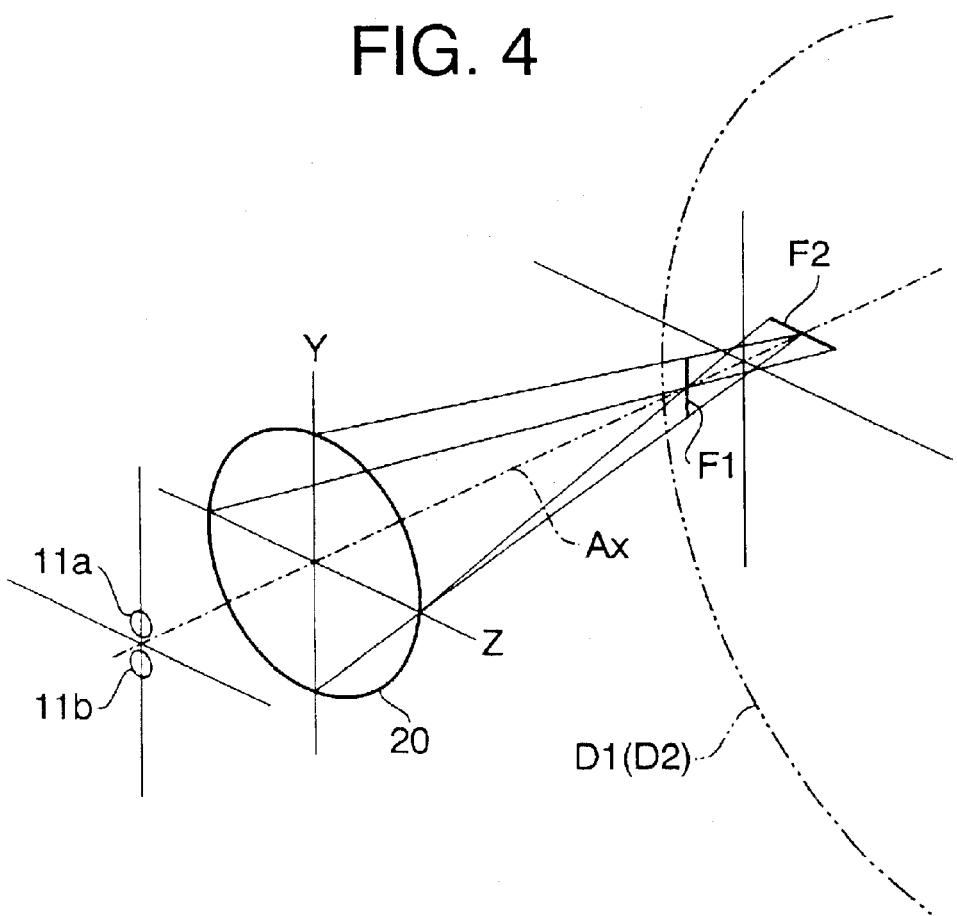

SPHERICAL ABERRATION SA
OFFENSE AGAINST
SINE CONDITION SC

ASTIGMATISM

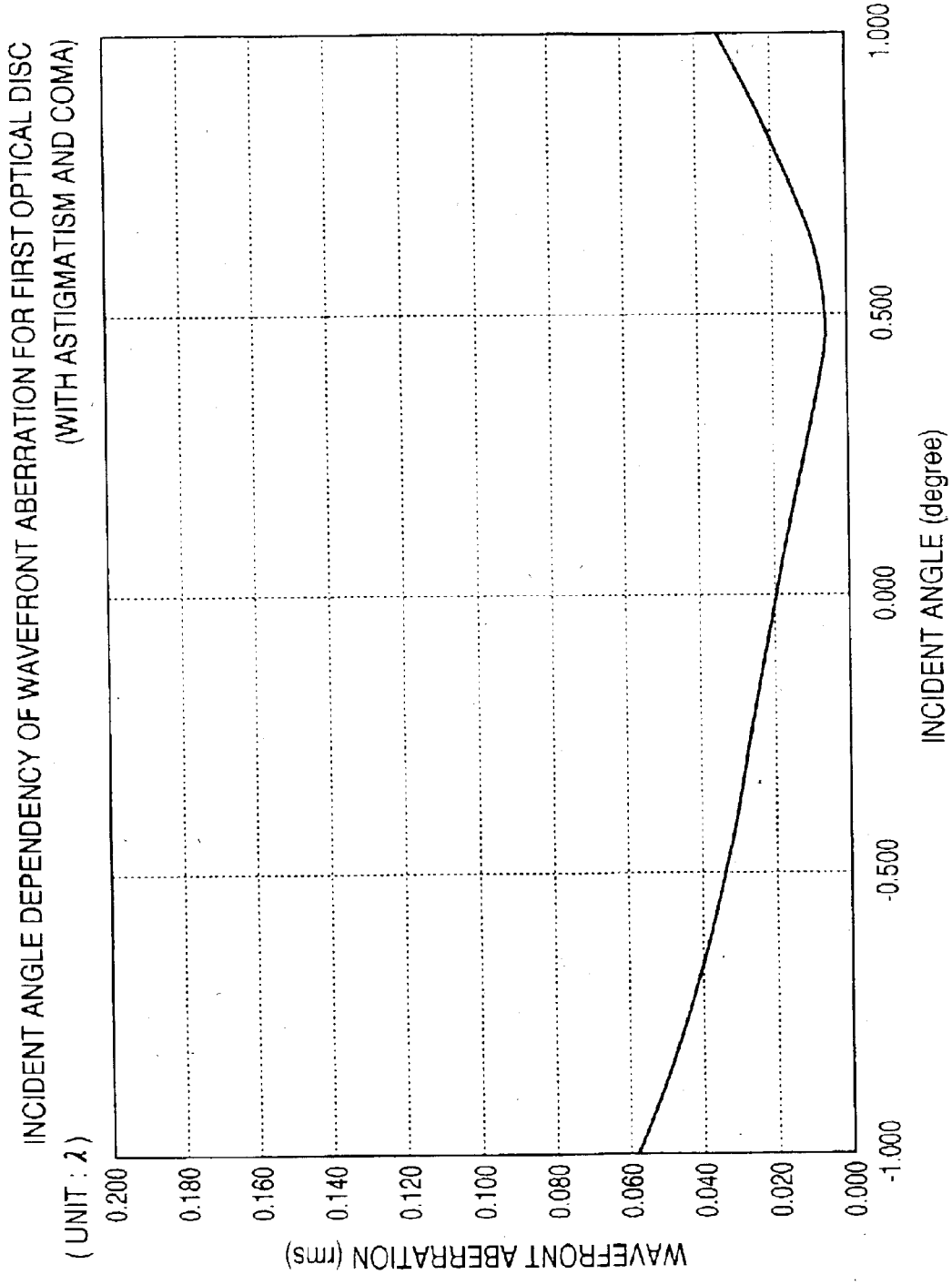

SPHERICAL ABERRATION SA
OFFENSE AGAINST SINE
CONDITION SC

ASTIGMATISM

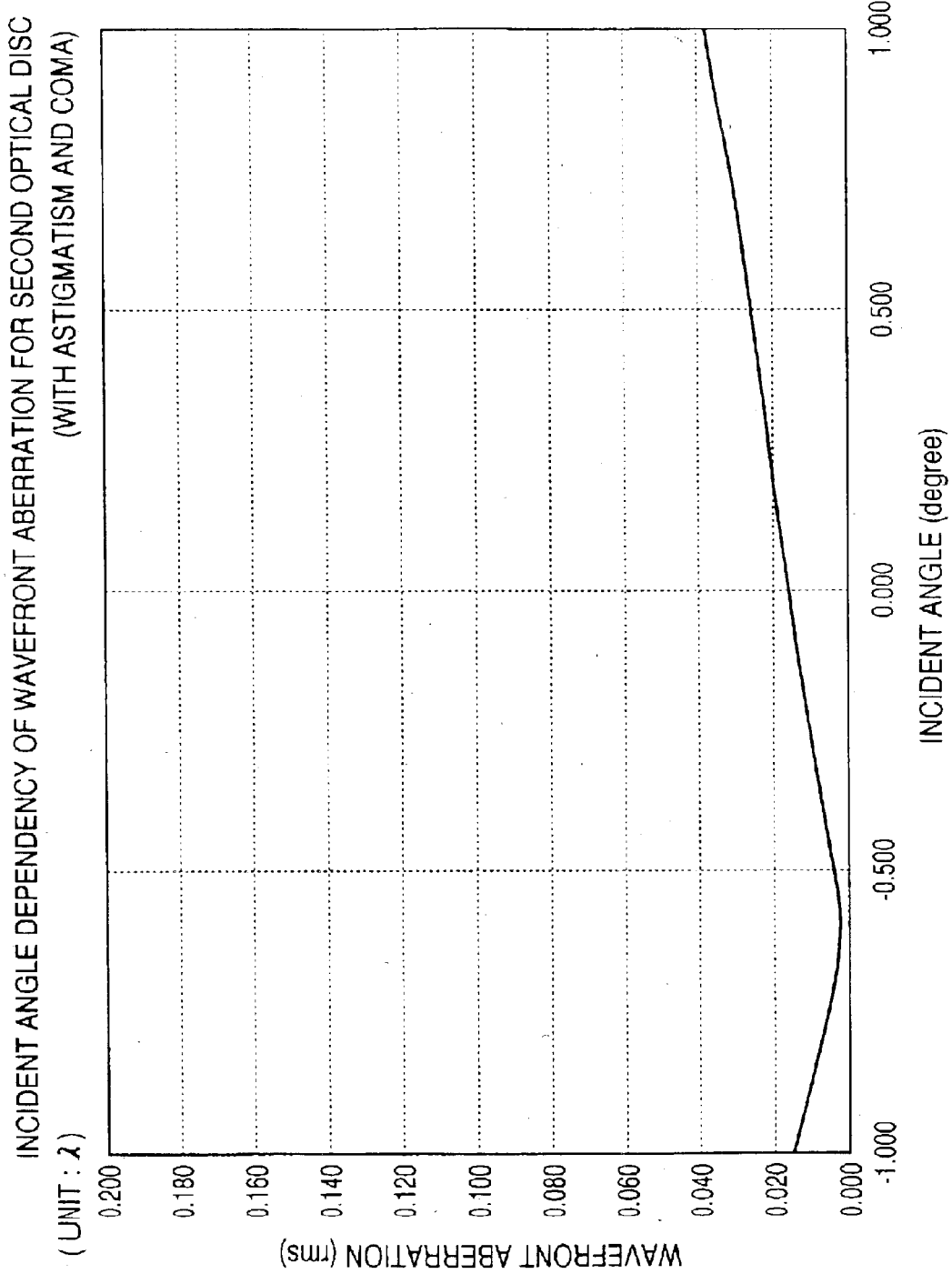

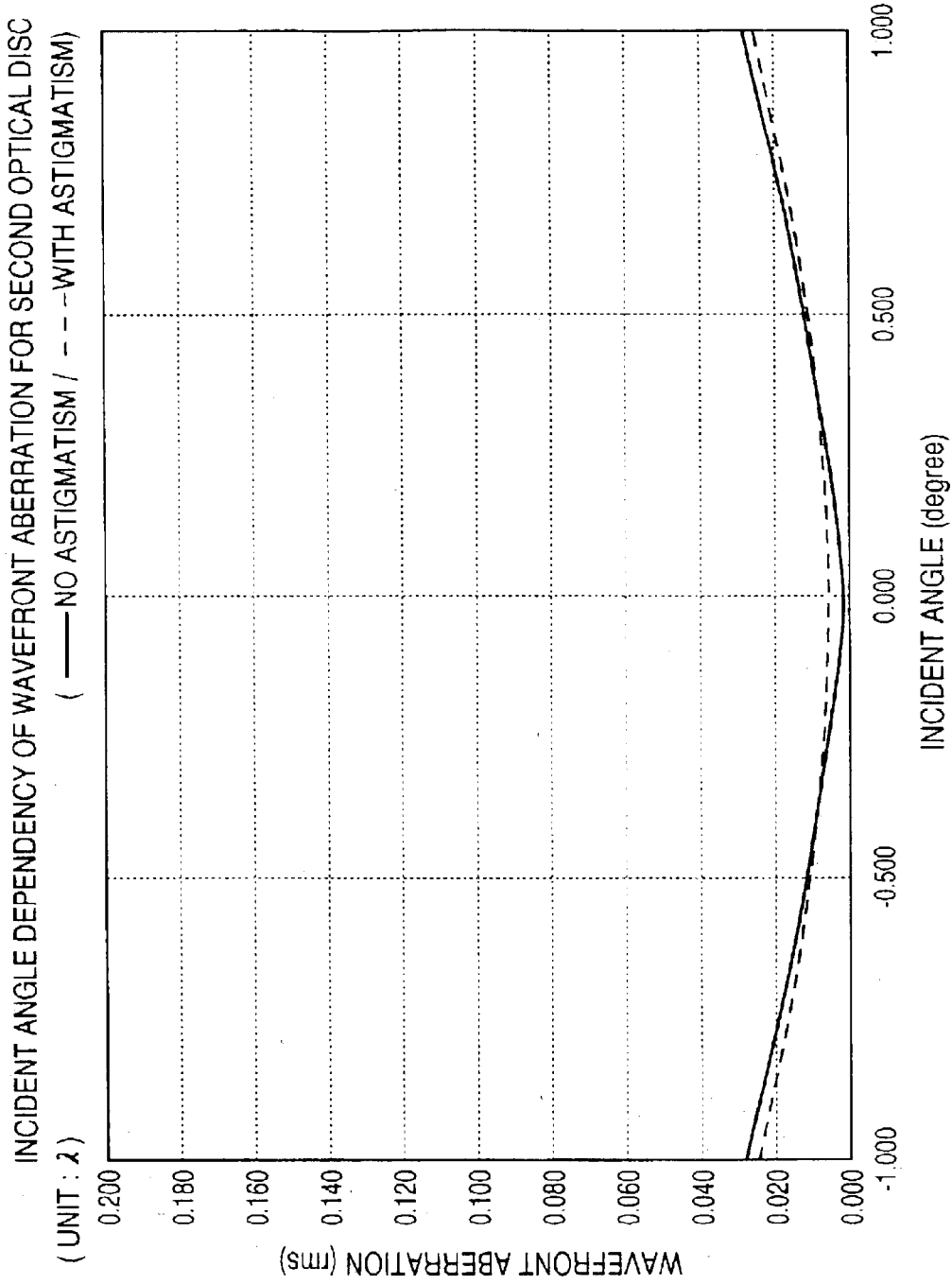

SPHERICAL ABERRATION SA
OFFENSE AGAINST
SINE CONDITION SC

ASTIGMATISM

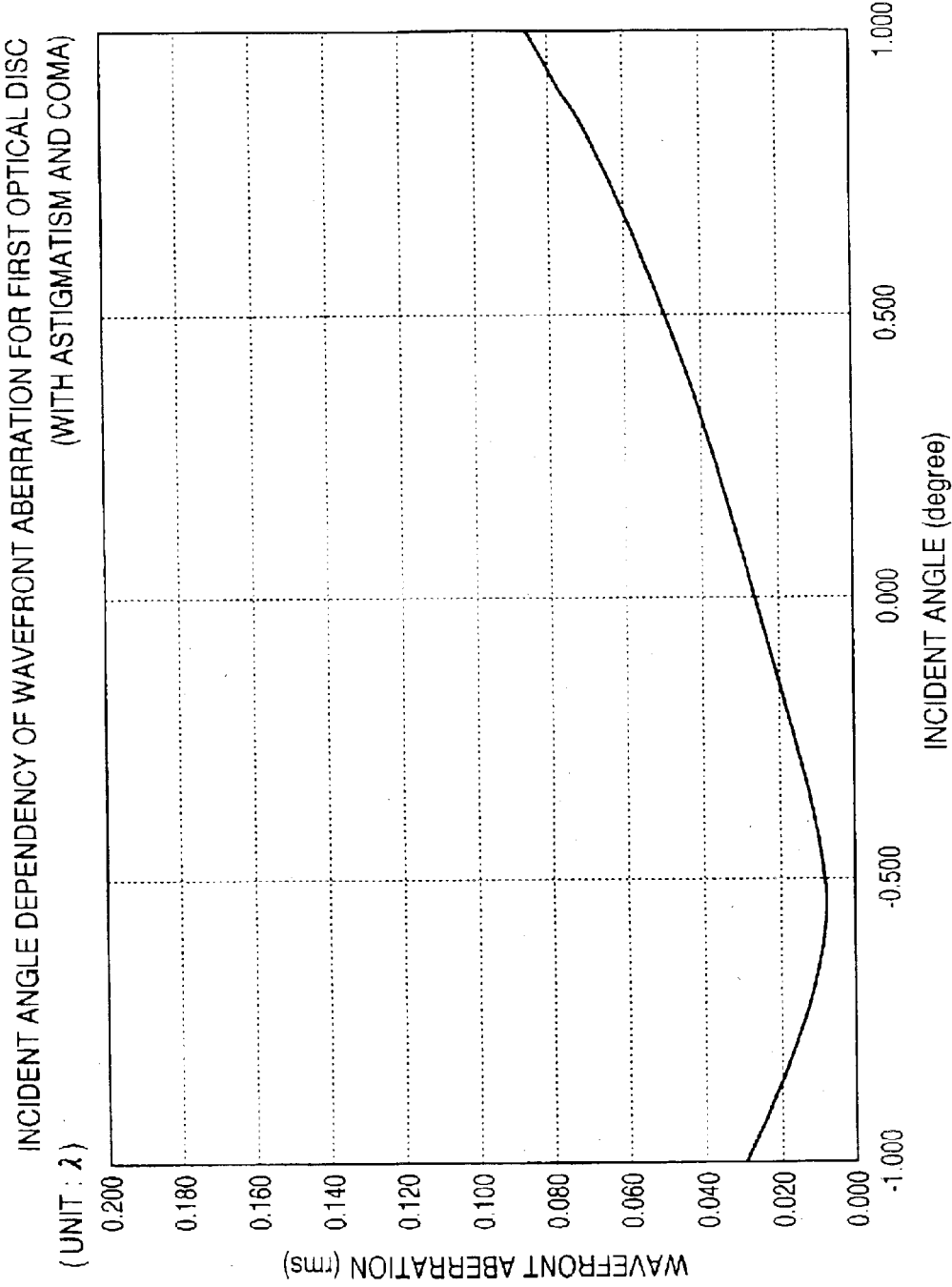

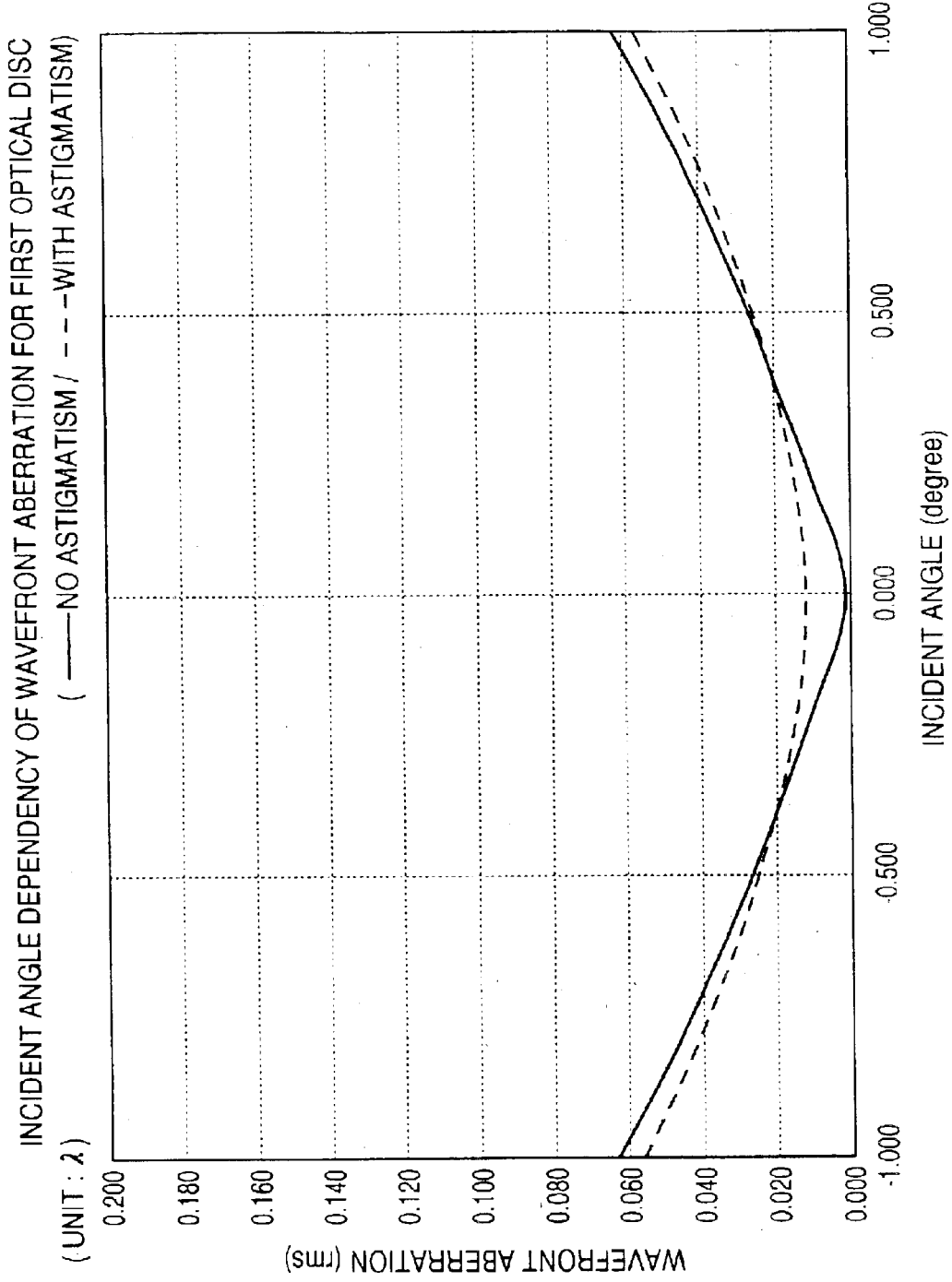

SPHERICAL ABERRATION SA
OFFENSE AGAINST
SINE CONDITION SC

ASTIGMATISM

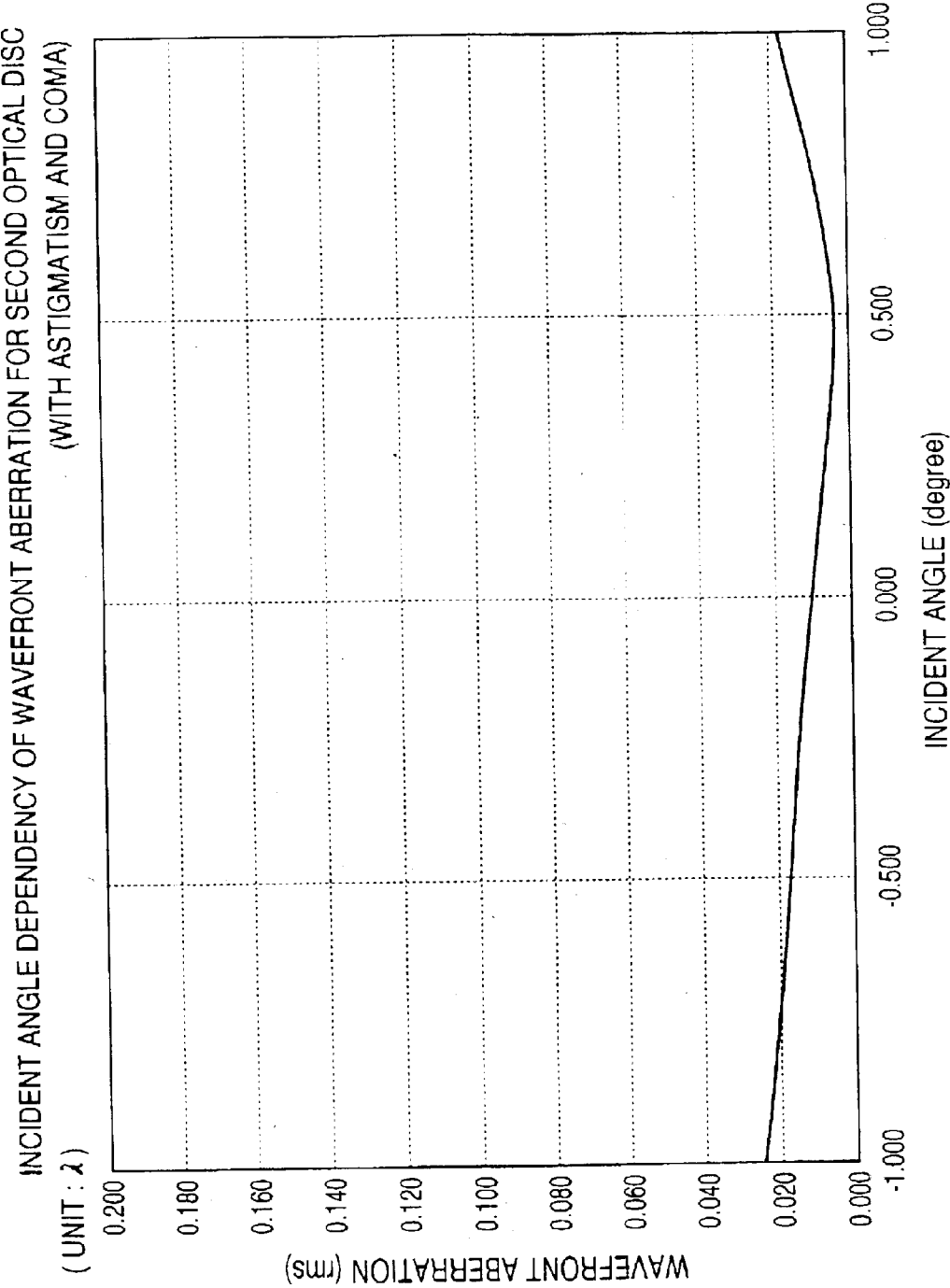

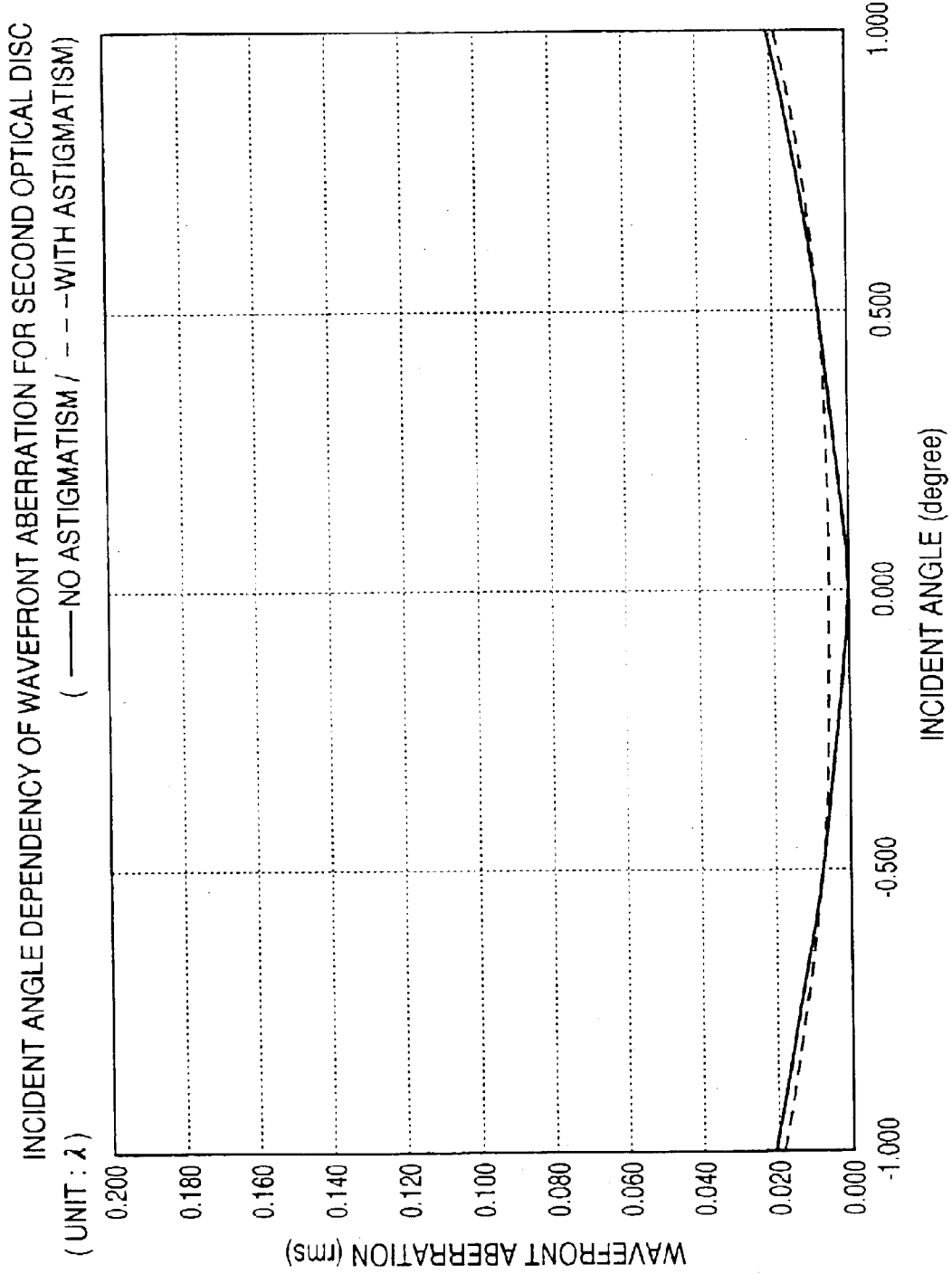

OBJECTIVE LENS FOR OPTICAL PICK-UP

BACKGROUND OF THE INVENTION

The present invention relates to an objective lens employed in an optical pick-up to be employed in an optical disc device capable of reading/writing from/to two or more types of optical discs having different cover layer thicknesses and data densities.

There exist many types of optical discs according to various standards having different thicknesses of the cover layer (transparent substrate covering the recording surface) and different data densities. For instance, the cover layer thickness of CD (Compact Disc) and CD-R (Compact Disc Recordable) having relatively low data density is 1.2 mm, while that of DVD (Digital Versatile Disc) having relatively high data density is 0.6 mm (½ of that of CD/CD-R).

For the reading/writing of DVDs having high data density, a laser beam having a relatively short wavelength (635–660 nm) is necessary in order to realize a small beam spot diameter. On the other hand, a laser beam having a relatively long wavelength (approximately 780 nm) is necessary for the reading/writing of CD-Rs due to their reflection characteristics.

Since these optical discs are often used in the same optical device, optical disc devices (CD players, DVD recorders, etc.) are desired to support all the optical disc standards. In order to use both DVDs and CD-Rs, the optical disc device is required to have at least two laser diodes for emitting laser beams of wavelengths suitable for the characteristics of the optical discs. Meanwhile, for downsizing the optical disc device, the optical system of its optical pick-up has to be as compact as possible. Therefore, it is preferable that optical elements of the optical pick-up (objective lens, etc.) be shared between two wavelengths and a module containing two laser diodes in one package be employed as a light source unit.

However, if one objective lens is used for each of two types of optical discs which have different cover layer thicknesses as above and spherical aberration is corrected for both discs, it becomes impossible to correct coma for both discs. Therefore, wavefront aberration has its minimum value when the laser beam's incident angle to the objective lens is 0° and increases as the incident angle deviates from 0° for both optical discs. Meanwhile, since DVDs with high data density require a large NA (Numerical Aperture), astigmatism changes greatly as the incident angle changes, by which allowable range of the incident angle (in which required performance can be attained) for DVDs becomes narrower than that for CDs. Therefore, the allowable incident angle range in which the wavefront aberration for DVD can be kept within an allowable limit is included in an allowable incident angle range for CD, overlapping with the center of the range for CD.

When a module containing two laser diodes in one package is employed for the light source unit as mentioned above, light emitting points of the two laser diodes are aligned in a direction perpendicular to the optical axis of the objective lens. Therefore, there exists a certain difference of incident angle (to the objective lens) between the two laser beams having different wavelengths, and it is impossible to set both the incident angles (of the two laser beams having different wavelengths) to 0° in order to minimize the wavefront aberrations. For the above reasons, the incident angles of the two laser beams have to be properly set in a balanced manner so that the wavefront aberrations for the two optical discs will be within the allowable limit. However, since the allowable incident angle range (in which the wavefront aberration can be kept within the allowable limit) stretches around 0° for each laser beam, in order to maintain a preset incident angle difference between the two laser beams, the incident angles to DVD and CD will generally have opposite signs (+/−) and each incident angle is necessitated to be set close to the edge of each allowable incident angle range. Therefore, due to the narrow range of settable incident angle for each laser beam, precise setting is required for the assembly of the elements of the optical pick-up, taking time and trouble. Further, even if the assembly is completed perfectly according to design values, the whole optical system has to be maintained with high accuracy since the wavefront aberration is already close to the allowable limit.

SUMMARY OF THE INVENTION

The present invention has been made in consideration of the above problems. According to the present invention, there is provided an optical disc device for an optical pick-up of an optical disc drive by which the aberrations can be reduced and signal reading/writing from/to multiple types of optical discs of different standards can be realized even in the case where a module containing two laser diodes in one package is employed for the light source unit and the optical elements (objective lens etc.) are shared between two wavelengths.

In accordance with a first aspect of the present invention, there is provided an objective lens of an optical pick-up which converges a shorter wavelength laser beam on a first optical disc having a thin cover layer and high data density and converges a longer wavelength laser beam on a second optical disc having a thick cover layer and low data density. The objective lens is formed to provide axial astigmatism corresponding to wavefront aberration of $0.01\lambda$ [rms] or more when the shorter wavelength laser beam is converged on the first optical disc, and to provide abaxial third order coma so that its sign when the shorter wavelength laser beam is converged on the first optical disc will be opposite to its sign when the longer wavelength laser beam is converged on the second optical disc in a virtual state in which the optical axis of the objective lens coincides with the normal of the optical disc.

Since the objective lens is configured to provide the axial astigmatism (astigmatism on the optical axis), an allowable incident angle range (allowable range of the incident angle of a laser beam to the optical disc in which wavefront aberration can be kept within an allowable limit) can be widened for each optical disc even though the minimum value of the wavefront aberration increases. Further, since the objective lens is configured to provide comas of opposite signs for the first optical disc (for which the shorter wavelength laser beam is used) and the second optical disc (for which the longer wavelength laser beam is used), both the wavefront aberrations for the first and second optical discs can be corrected at different incident angles to the first and second optical discs by tilting the optical axis of the objective lens relative to the normal of the optical disc. In other words, two incident angles (to the first and second optical discs) capable of minimizing the wavefront aberrations for the first and second optical discs shift in opposite directions relative to 0°, and the allowable incident angle ranges (in which the wavefront aberrations can be kept within an allowable limit) for the first and second optical discs also shift in opposite directions relative to 0°.

Therefore, the allowable incident angle range for the first optical disc and that for the second optical disc can be set in different angle ranges (even if part of them overlapped with each other), differently from the conventional cases where the allowable incident angle range for the first optical disc is totally included in that for the second optical disc. By this, even if a laser module having two light emitting points is employed (that is, even if two laser beams emitted from two light emitting points and incident on the objective lens had a certain incident angle difference), each incident angle to each optical disc can be set in a wide range, by which aberrations can be reduced for both the first and second optical discs and an excellent beam spot can be formed on both optical discs, without the need of precise assembly and setting which used to be necessary for conventional optical pick-ups.

Preferably, the objective lens is formed as an infinite conjugate type lens which focuses the shorter/longer wavelength laser beam incident on the objective lens as parallel light on the first/second optical disc.

When the objective lens is formed by a single lens, it is preferable that one surface of the objective lens be provided with a diffraction lens structure having annular zones which is formed so that spherical aberration provided by the diffraction lens structure will have wavelength dependency such that the spherical aberration changes in an undercorrected direction as the wavelength gets longer.

In accordance with a second aspect of the present invention, there is provided an optical pick-up including a first laser diode which emits a shorter wavelength laser beam, a second laser diode which emits a longer wavelength laser beam, whose light emitting point is placed in the vicinity of that of the first laser diode, and the aforementioned objective lens which converges the shorter wavelength laser beam emitted by the first laser diode on the first optical disc and converges the longer wavelength laser beam emitted by the second laser diode on the second optical disc. In the optical pick-up, light emitting points of the first and second laser diodes are arranged so that focal points formed by the laser beams emitted by the first and second laser diodes will be aligned parallel to one of two focal lines that is formed nearer to the objective lens when parallel light is incident on the objective lens in the direction of the optical axis of the optical system of the optical pick-up, and the optical axis of the objective lens is tilted relative to the normal of the optical disc in a plane including the focal line nearer to the objective lens.

Since the objective lens is configured to have the aforementioned coma and the optical axis of the objective lens is tilted relative to the normal of the optical disc, the comas can be corrected both for the first and second optical discs. The tilt of the optical axis of the objective lens relative to the normal of the optical disc can be realized by two methods: (A) Tilting the optical axis of the whole optical system from the first and second laser diodes to the objective lens relative to the normal of the optical disc; and (B) Tilting the optical axis of the objective lens relative to the normal of the optical disc coinciding with the optical axis of the optical system excluding the objective lens.

In the case of (A), effect caused by the difference of cover layer thickness between the first and second optical discs is canceled out by effect caused by the difference of necessary NA (due to the difference of data density) between the first and second optical discs. For example, when the first optical disc is a DVD and the second optical disc is a CD, the above effects are canceled out almost perfectly, and the change of the coma by the tilting becomes almost equal for the first and second optical discs.

In the case of (B), the change of the coma for the first optical disc by the tilting becomes larger than that for the second optical disc due to the effect caused by the difference of necessary NA.

Since incident angles capable of minimizing the astigmatism are almost equal for the first and second optical discs, it is desirable that incident angles capable of minimizing the coma be set equal for the first and second optical discs; however, the change of the coma by the tilting differs between the cases (A) and (B). Therefore, it is preferable that the amount of coma of the objective lens be changed depending on the setting.

In the case of (A), it is preferable that the abaxial coma for the first optical disc be −1 times that for the second optical disc, and the following relationship is desired to be satisfied in a virtual state in which the optical axis of the objective lens coincides with the normal of the optical disc:

$$-2.0 < SC_1/SC_2 < -0.5 \qquad (1)$$

where $SC_1$ denotes offense against the sine condition SC at the outer radius of an effective area when the shorter wavelength laser beam is converged on the first optical disc, and $SC_2$ denotes the offense against the sine condition SC at the outer radius of a common area when the longer wavelength laser beam is converged on the second optical disc.

In the case of (B), it is preferable that the abaxial coma for the first optical disc be −2 times that for the second optical disc, and the following relationship is desired to be satisfied:

$$-4.0 < SC_1/SC_2 < -1.0 \qquad (2)$$

The offense against the sine condition SC is defined as:

$$SC = nH_1/(n' \sin U') - f(1-m)$$

where n denotes the refractive index on the incident side, n' denotes the refractive index on the emerging side, U' denotes the angle between the emerging beam and the optical axis, m denotes the paraxial magnification, $H_1$ denotes the ray height on the principal plane, and f denotes the focal length. The common area is defined as an area of the objective lens through which light corresponding an NA necessary and sufficient for the second optical disc passes.

The aforementioned axial astigmatism can be given to the objective lens by forming a surface of the objective lens to have different power depending on the direction, such as a toric surface. When the objective lens is manufactured by injection molding, the astigmatism can be realized either by using a mold with a surface having different power depending on the direction or by properly adjusting the molding conditions.

In accordance with a third aspect of the present invention, there is provided an optical disc device which is provided with a spindle motor which spins an optical disc, the aforementioned optical pick-up, and a driving mechanism which slides at least part of the optical pick-up in the radial direction of the optical disc. In the optical disc device, the position of the optical pick-up relative to the optical disc is set so that the aforementioned focal line nearer to the objective lens will be parallel to tracks of the optical disc when seen in the direction of the optical axis of the objective lens.

BRIEF DESCRIPTION OF THE ACCOMPANYING DRAWINGS

FIGS. 3A through 3C are a front view, a cross-sectional view (seen from the side) and a partly enlarged cross-sectional view of an objective lens of the optical disc device;

FIG. 4 is a perspective view showing directional character of astigmatism which is provided by the objective lens and the alignment of laser diodes relative to an optical disc;

Figure 5A:
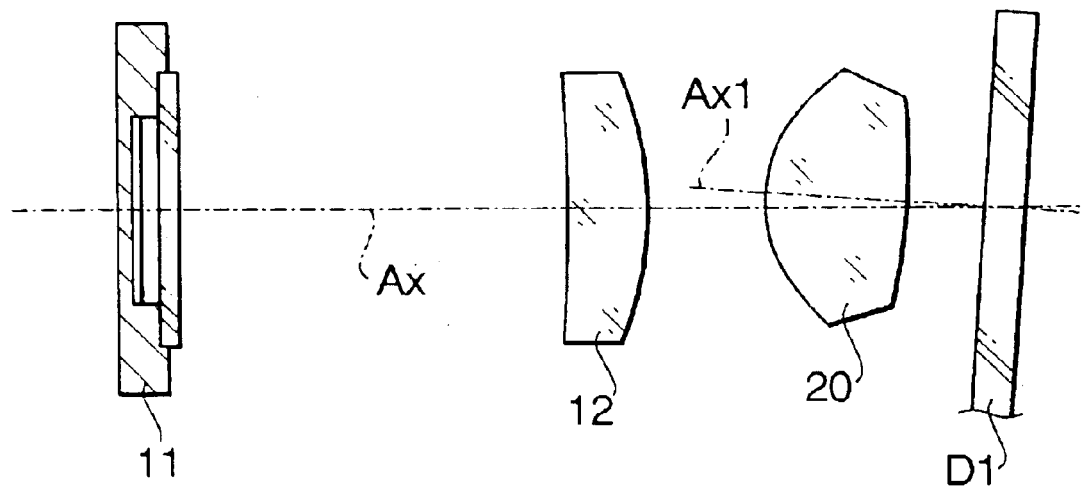
Figure 5B:
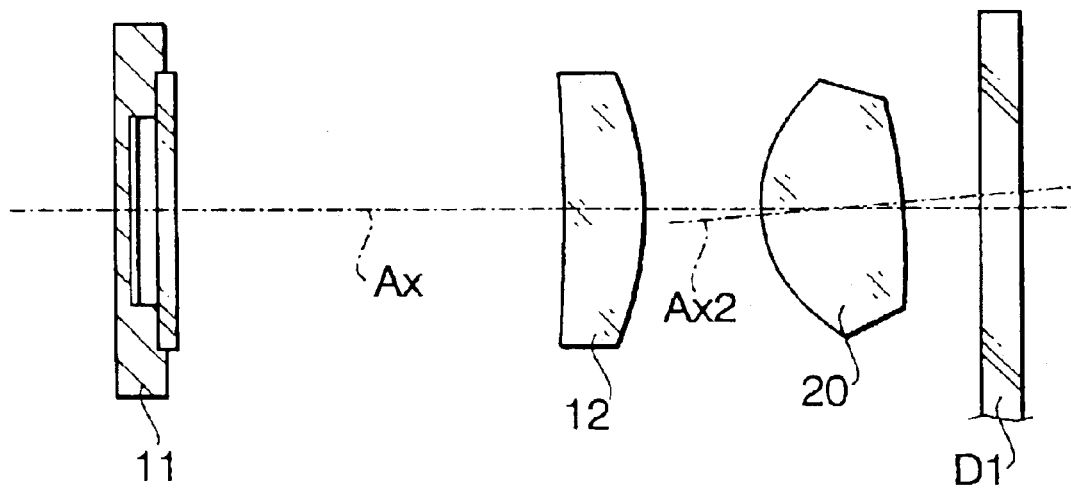
Figure 6:
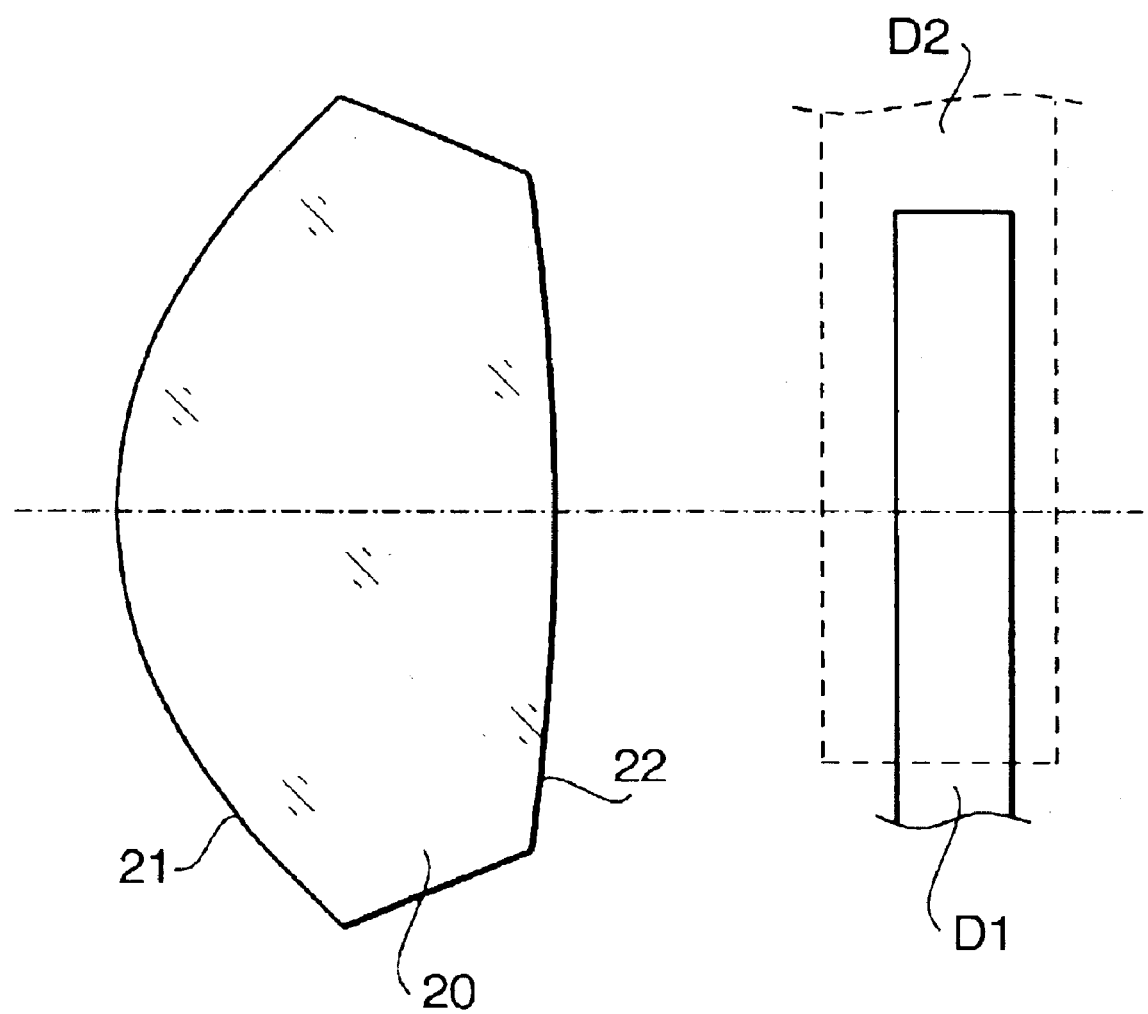
Figure 7A:
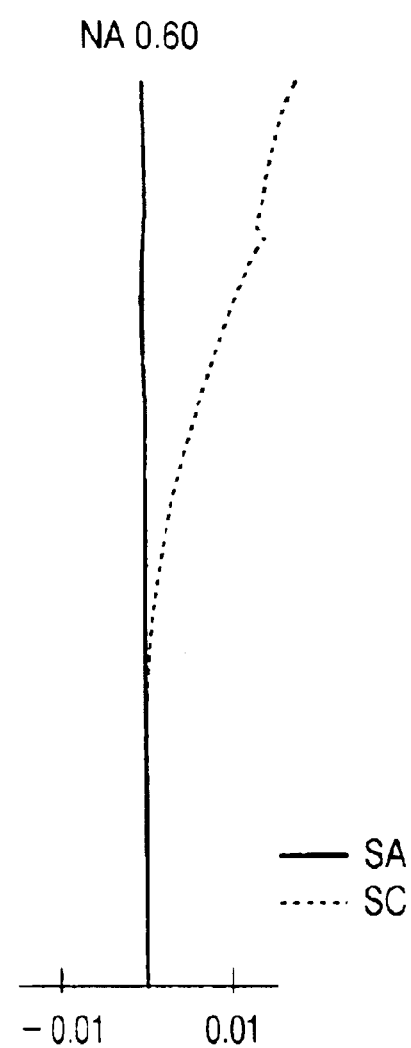
Figure 7B:
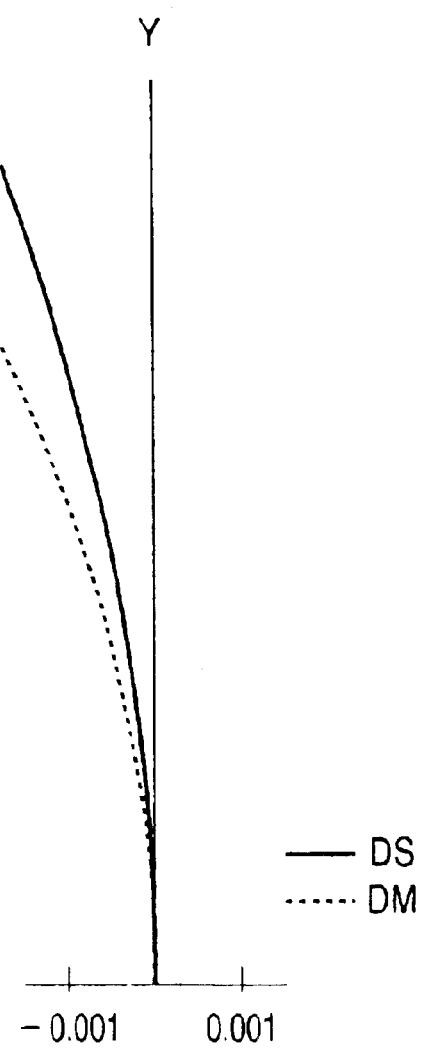
Figure 9:
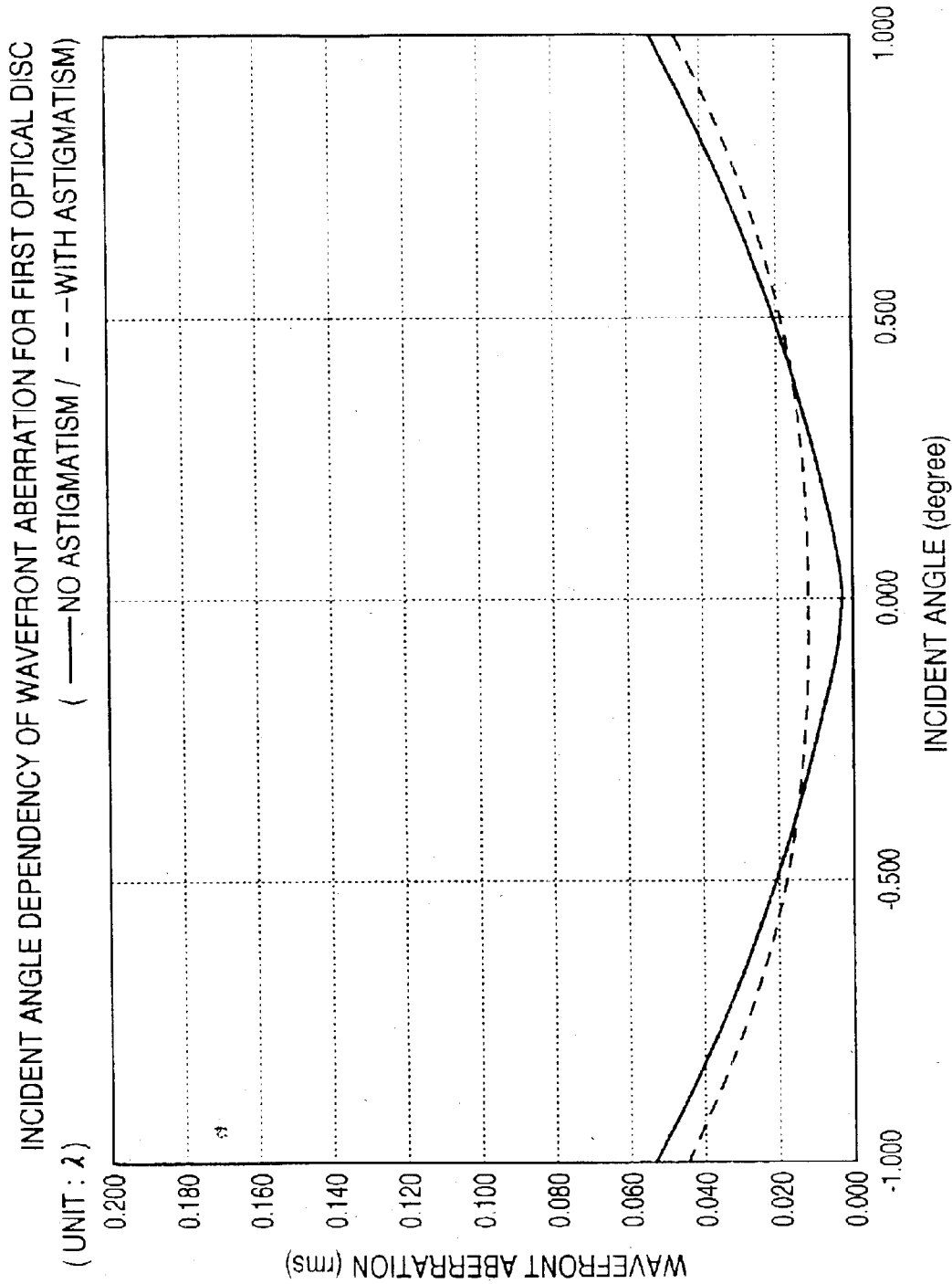
Figure 10A:
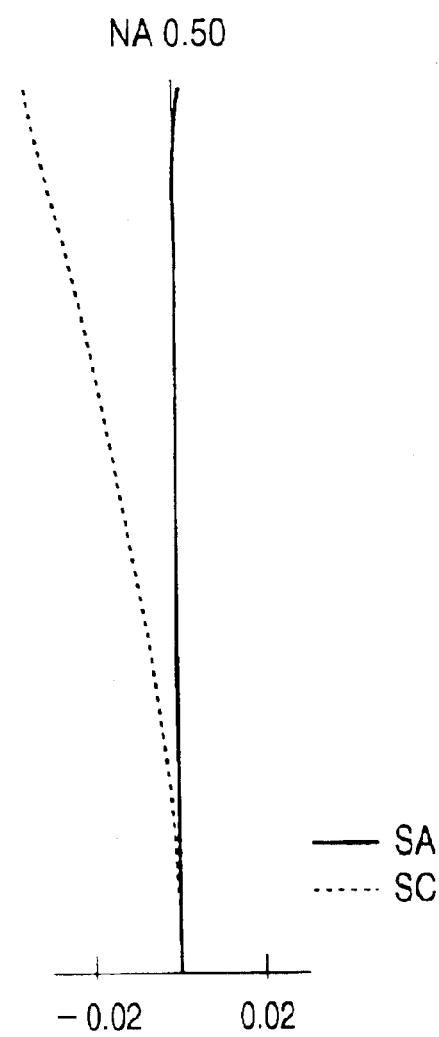
Figure 10B:
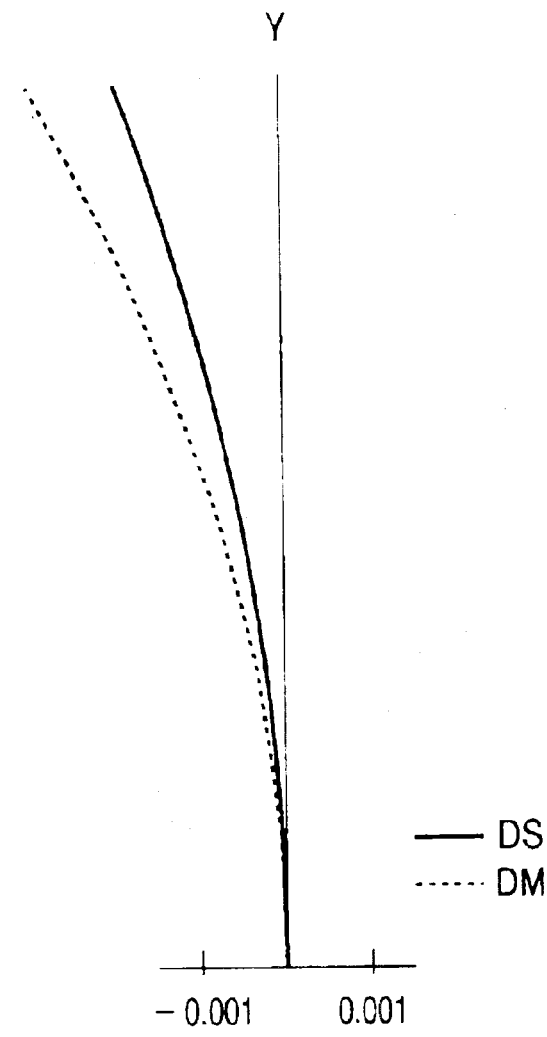
Figure 13:
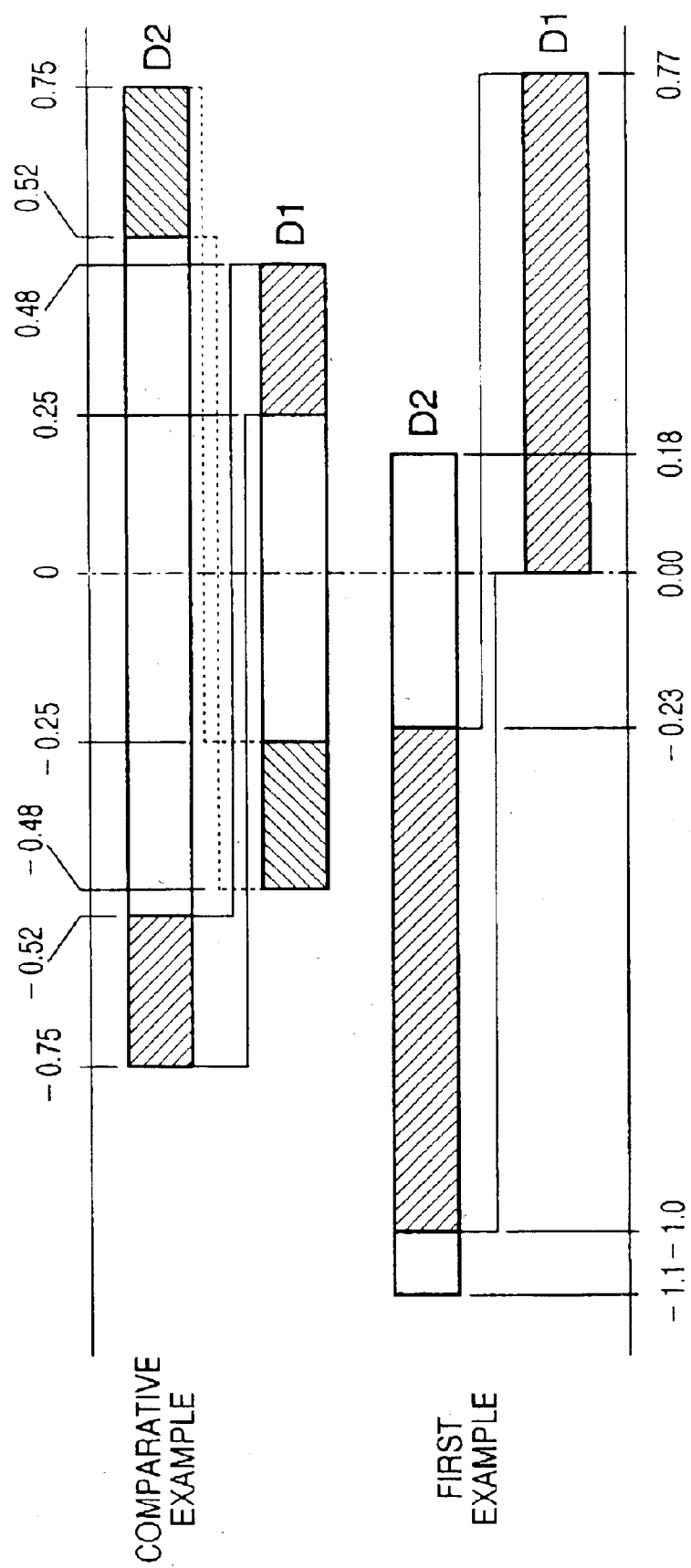
Figure 14:
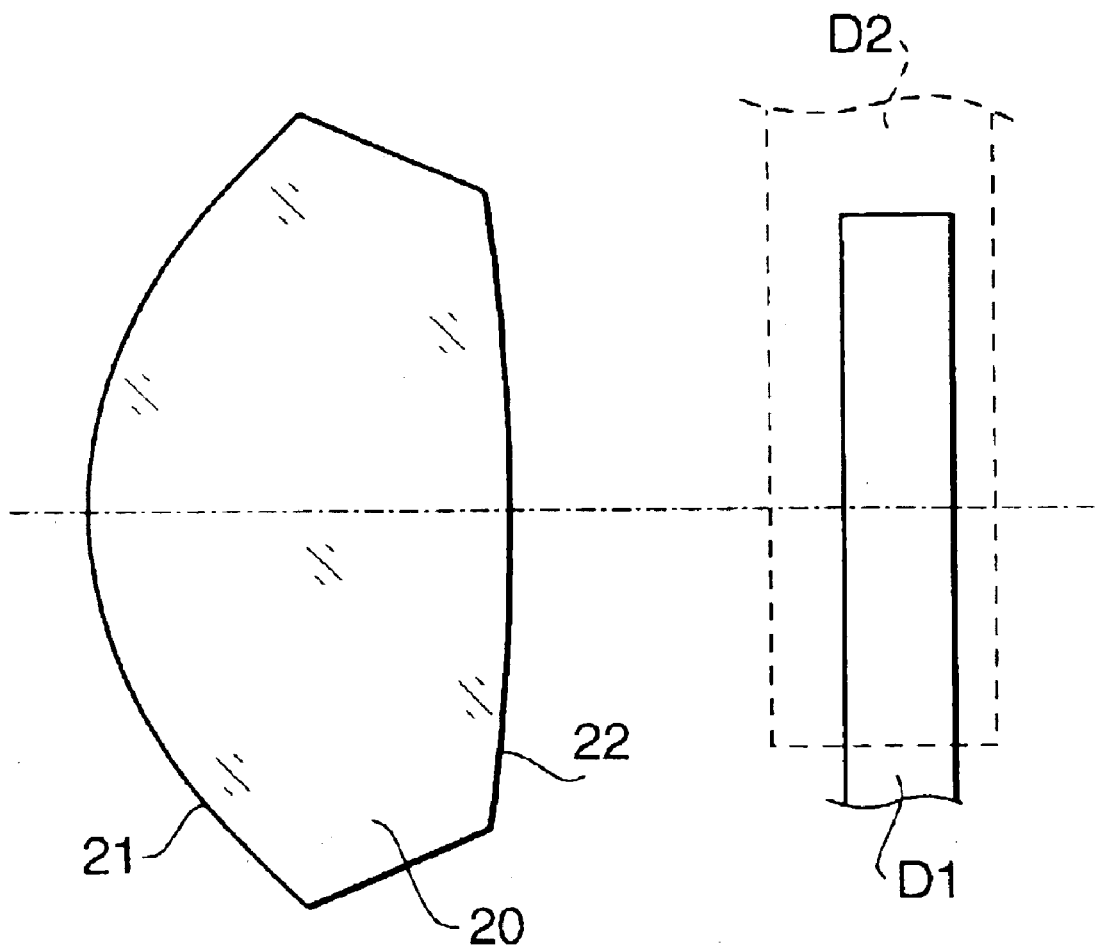
Figure 15A:
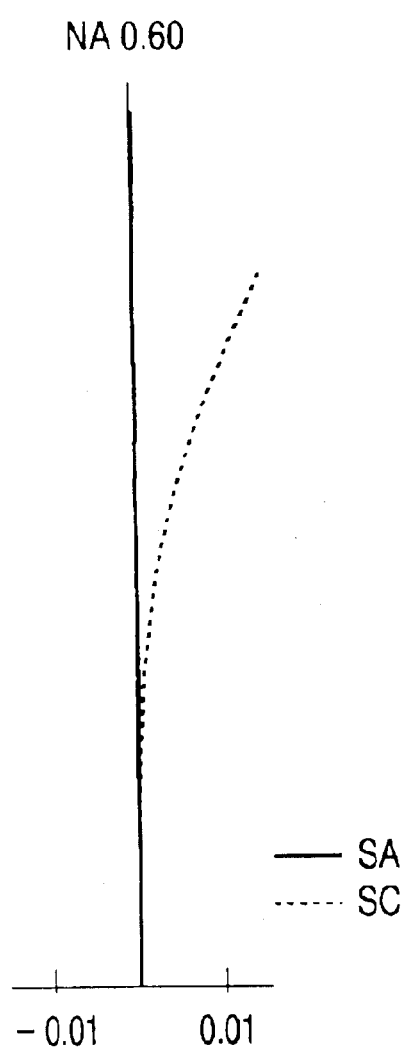
Figure 15B:
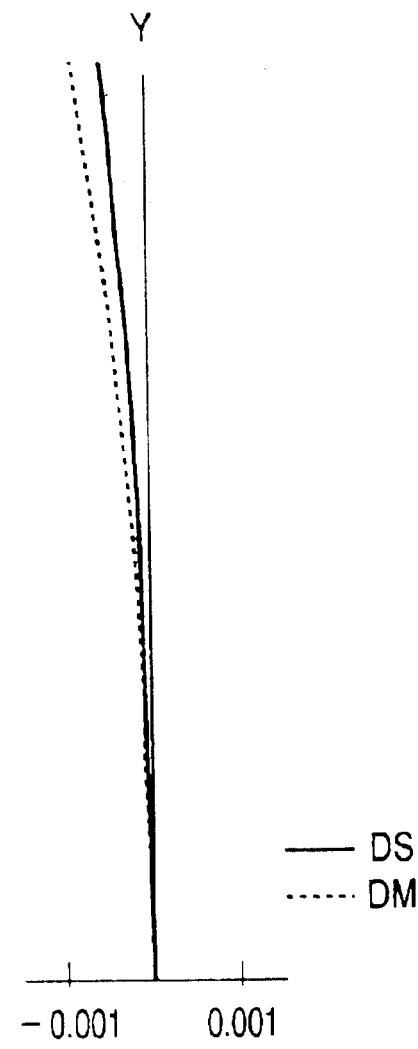
Figure 18A:
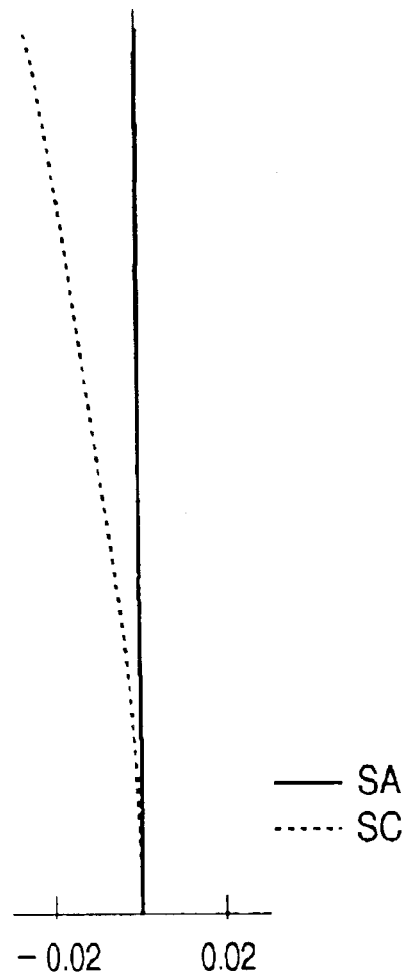
Figure 18B:
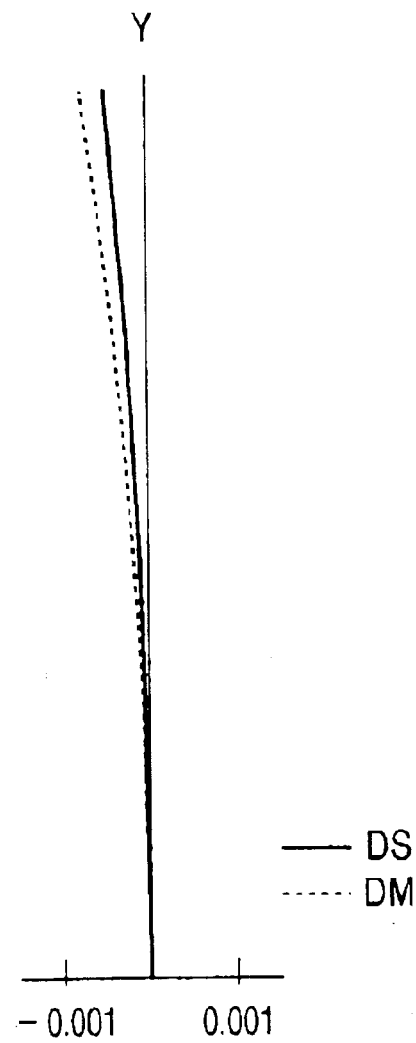

FIGS. 5A and 5B are explanatory drawings showing concrete examples of methods for tilting the optical axis of the objective lens relative to the normal of the optical disc, in which FIG. 5A shows an example in which the normal of the optical disc is tilted relative to the optical axis of the whole optical system, and FIG. 5B shows another example in which only the optical axis of the objective lens is tilted relative to the optical axis of the optical system (coinciding with the normal of the optical disc);

FIG. 6 is a lens diagram showing an objective lens as a first example and the optical disc;

FIGS. 7A and 7B are graphs showing aberrations of the objective lens of the first example for a first optical disc at a corresponding first wavelength (shorter wavelength: 657 nm);

FIG. 8 is a graph showing the relationship between the incident angle of the shorter wavelength laser beam to the objective lens of the first example and wavefront aberration when the first optical disc is used;

FIG. 9 is a graph similar to FIG. 8, showing a case where axial astigmatism and coma are removed from the objective lens of the first example and a case where only the coma is removed from the objective lens of the first example;

FIGS. 10A and 10B are graphs showing aberrations of the objective lens of the first example for a second optical disc at a corresponding second wavelength (longer wavelength: 788 nm);

FIG. 11 is a graph showing the relationship between the incident angle of the longer wavelength laser beam to the objective lens of the first example and wavefront aberration when the second optical disc is used;

FIG. 12 is a graph similar to FIG. 11, showing a case where axial astigmatism and coma are removed from the objective lens of the first example and a case where only the coma is removed from the objective lens of the first example;

FIG. 13 is an explanatory drawing showing the difference of allowable incident angle ranges (for keeping the wavefront aberration within an allowable limit) between the objective lens of the first example and an objective lens as a comparative example;

FIG. 14 is a lens diagram showing an objective lens as a second example and the optical disc;

FIGS. 15A and 15B are graphs showing aberrations of the objective lens of the second example for the first optical disc at the first wavelength (shorter wavelength: 657 nm);

FIG. 16 is a graph showing the relationship between the incident angle of the shorter wavelength laser beam to the objective lens of the second example and wavefront aberration when the first optical disc is used;

FIG. 17 is a graph similar to FIG. 16, showing a case where axial astigmatism and coma are removed from the objective lens of the second example and a case where only the coma is removed from the objective lens of the second example;

FIGS. 18A and 18B are graphs showing aberrations of the objective lens of the second example for the second optical disc at the second wavelength (longer wavelength: 788 nm);

FIG. 19 is a graph showing the relationship between the incident angle of the longer wavelength laser beam to the objective lens of the second example and wavefront aberration when the second optical disc is used; and FIG. 20 is a graph similar to FIG. 19, showing a case where axial astigmatism and coma are removed from the objective lens of the second example and a case where only the coma is removed from the objective lens of the second example.

DESCRIPTION OF THE EMBODIMENTS

Referring now to the drawings, a description will be given in detail of embodiments in accordance with the present invention. In the description below, an embodiment of an optical disc device including an optical pick-up having an objective lens in accordance with the present invention will be described first and thereafter concrete design examples of the objective lens will be explained.

Figure 1:
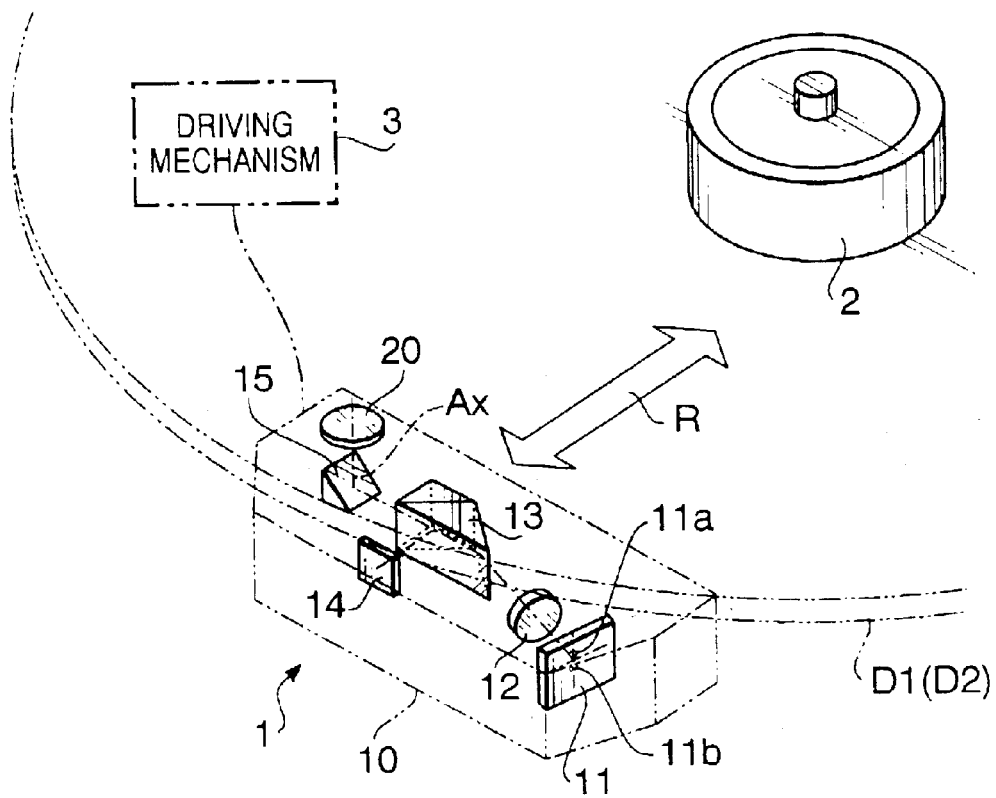
FIG. 1 is a perspective view showing a part of an optical disc device in accordance with an embodiment of the present invention.
Figure 2:
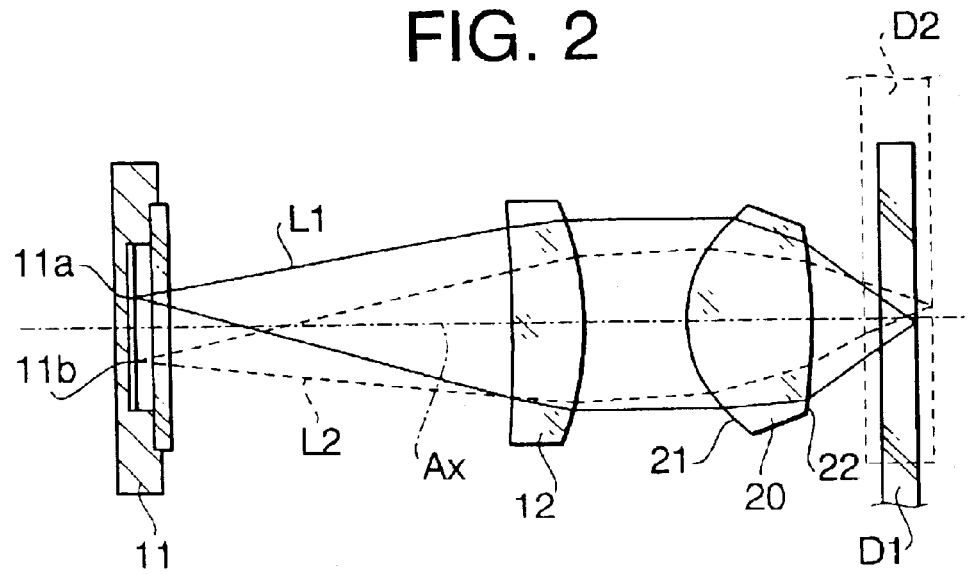
FIG. 2 is an explanatory drawing showing optical paths in an optical pick-up of the optical disc device of FIG. 1

FIG. 1 is a perspective view showing a portion of an optical disc device in accordance with an embodiment of the present invention. FIG. 2 is an explanatory drawing showing optical paths in the optical pick-up employed in the optical disc device of FIG. 1.

The optical disc device 1 is available for a first optical disc D1 such as a high-data-density DVD having a cover layer of 0.6 mm thick and a second optical disc D2 such as a low-data-density CD or CD-R having a cover layer of 1.2 mm thick. As shown in FIG. 1, the optical disc device 1 includes an optical pick-up 10 and a spindle motor 2 for spinning the optical disc (D1, D2). The optical pick-up 10 is slid in the radial direction R of the optical disc (D1, D2) by a driving mechanism 3.

The optical pick-up 10 includes a laser module 11 containing a first laser diode 11a and a second laser diode 11b, a collimating lens 12 for collimating diverging light emitted by each laser diode, a beam shaping/splitting prism 13 for shaping the sectional form of the laser beam while obtaining a laser beam for monitoring (monitor beam) by splitting the laser beam, a monitor sensor 14 for receiving and detecting the split monitor beam, a mirror 15 for reflecting the laser beam which passed through the beam shaping/splitting prism 13 into the optical disc (D1, D2), and an objective lens 20 for converging the reflected laser beam on a recording surface of the optical disc (D1, D2).

The laser diodes 11a and 11b are closely packed and built in one package as the laser module 11. The laser module 11 is placed so that light emitting points of the laser diodes 11a and 11b will be placed on both sides of the optical axis Ax of the optical system, which coincides with the optical axis of the objective lens 20. Therefore, both the light emitting points of the first and second laser diodes 11a and 11b are placed off the optical axis Ax. The two laser diodes are placed and aligned so that focal points formed by the laser beams emitted by the laser diodes 11a and 11b will be aligned in a direction substantially parallel to the tangent line of the optical disc (D1, D2).

The first laser diode 11a emits a shorter wavelength laser beam L1 (657 nm) when the first optical disc D1 is used (shown with solid lines in FIG. 2). Meanwhile, the second laser diode 11b emits a longer wavelength laser beam L2 (790 nm) when the second optical disc D2 is used (shown with broken lines in FIG. 2). Each laser beam emitted by each laser diode as diverging light is collimated by the collimating lens 12 into parallel light. The collimated laser beam travels to the objective lens 20 via the beam shaping/splitting prism 13 and the mirror 15, and is converged by the objective lens 20 to form a beam spot on the recording surface of the optical disc (on the back of the cover layer).

Incidentally, the beam shaping/splitting prism 13 and the mirror 15 are not shown in FIG. 2 for the sake of simplicity. While both the laser beams L1 and L2 from the first and second laser diodes 11a and 11b are shown in FIG. 2 and both the first and second optical discs D1 and D2 are shown in FIG. 2 overlapping with each other, only one laser beam (shorter wavelength laser beam L1) is emitted by the first laser diode 11a when the first optical disc D1 is used and only one laser beam (longer wavelength laser beam L2) is emitted by the second laser diode 11b when the second optical disc D2 is used.

A reflected beam from the optical disc is collimated by the objective lens 20 into parallel light, converged by the collimating lens 12, and is led to the laser module 11. The laser module 11 is equipped with a plurality of light receiving elements (unshown) in order to receive the reflected beam for generating a focusing error signal, a tracking error signal and a playback signal. Further, in order to split the reflected beam and lead each split beam to each of the light receiving elements, an unshown complex optical element (equally splitting the circular section of the beam into four areas and outputting the four split beams to different directions, for example) is placed on the optical path between the beam shaping/splitting prism 13 and the objective lens 20. By the above composition, the double knife edge method can be employed for the detection of the focusing error, and the phase difference method or push-pull method can be employed for the detection of the tracking error, by which the use of DVD, CD-R, CD, etc. becomes possible. Such methods are described in Japanese Patent Provisional Publication No.HEI11-53759, for example.

Further, the optical pick-up 10 is equipped with an unshown actuator which drives the objective lens 20 according to the detected focusing error signal and tracking error signal for letting the beam spot follow the information tracks on the optical disc.

In the following, the details of the objective lens 20 will be explained referring to FIGS. 3A through 3C. FIGS. 3A through 3C are a front view, a cross-sectional side view and a partly enlarged cross-sectional view of the objective lens 20. As shown in FIG. 3B, the objective lens 20 is a biconvex single lens. A first surface 21 of the objective lens 20 facing the collimating lens 12 is formed such that a diffraction lens structure is formed on a rotationally symmetrical aspherical surface, and a second surface 22 of the objective lens 20 facing the optical disc (D1, D2) is formed as a toric aspherical surface whose power varies depending on the direction. The toric aspherical surface is a curved surface without the rotational symmetry around the optical axis, having non-circular sectional form along the principal meridian.

On the first surface 21 of the objective lens 20, the diffraction lens structure, having a pattern of annular zones, is formed as shown in FIG. 3A. In the diffraction lens structure, a level difference exists in the optical axis direction at each interface between the annular zones as in Fresnel lenses. The first surface 21 can be divided into: a common area Rc through which either a low NA beam or a high NA beam passes; and an exclusive high NA area Rh through which a high NA beam passes. Specifically, the common area Rc defines a necessary and sufficient NA for the second optical disc D2 (CD, CD-R, etc. of low data density), while the exclusive high NA area Rh defines a necessary NA for the first optical disc D1 (DVD etc. of high data density). The diffraction lens structure is provided to the whole area of the first surface 21 including the common area Rc and the exclusive high NA area Rh. Incidentally, the beam for the second optical disc D2 also incident on the exclusive high NA area Rh. However, only a portion passing through the common area Rc contributes to form a beam spot on the second disc D2. The term low NA beam refers to the portion contributing to form the beam spot on the second disc D2.

The diffraction lens structure on the first surface 21 of the objective lens 20 is formed so that spherical aberration caused by the diffraction lens structure will have certain wavelength dependency, in which the spherical aberration changes in the undercorrected direction as the wavelength of the laser beam becomes longer. The spherical aberration of the optical pick-up generally changes in an "overcorrected" direction (a direction in which the spherical aberration changes to less undercorrected status or more overcorrected status) as the cover layer becomes thicker. Meanwhile, a shorter wavelength laser beam is used for the first optical disc D1 (DVD etc.) having a thin cover layer, while a longer wavelength laser beam is used for the second optical disc D2 (CD, CD-R, etc.) having a thick cover layer. Therefore, by correcting the spherical aberration with reference to the case where the first optical disc D1 is used and by providing the diffraction lens structure with the aforementioned characteristics (with the spherical aberration changing in an "undercorrected" direction (a direction in which the spherical aberration changes to less overcorrected status or more undercorrected status) when the laser beam wavelength is switched to the longer wavelength) as above, the spherical aberration of the optical pick-up, which generally is overcorrected on the switching from DVD to CD, can be compensated for and canceled out by use of the spherical aberration due to the diffraction lens structure which changes in the undercorrected direction on the switching into the longer wavelength (switching from DVD to CD).

Further, by the second surface 22 formed as a toric aspherical surface, the objective lens 20 gives certain astigmatism to a beam incident on the objective lens 20 in the normal direction (parallel to the optical axis Ax). In other words, when the laser beam from the first laser diode 11a is converged by the objective lens 20 on the first optical disc D1, the objective lens 20 provides axial a stigmatism (astigmatism on the optical axis) corresponding to wavefront aberration of more than $0.01\lambda$ [rms], by which astigmatism due to a preset off-axis incident angle is corrected.

FIG. 4 shows directional characteristics of the astigmatism and the alignment of the laser diodes 11a and 11b relative to the optical disc (D1, D2). In FIG. 4, a Y axis and a Z axis orthogonal to each other are defined in a plane perpendicular to the optical axis Ax. The objective lens 20 is formed to have stronger positive power in the Z direction than in the Y direction. Therefore, a beam incident on the objective lens 20 in the normal direction (parallel to the optical axis Ax) is converged by the objective lens 20 and forms a first focal line F1 extending in the Y direction at a position nearer to the objective lens 20 and then forms a second focal line F2 extending in the Z direction at a position farther from the objective lens 20.

The focal points of laser beams emitted by the first and second laser diodes 11a and 11b have to be aligned in the direction of the first focal line F1 (Y direction), therefore, the two laser diodes 11a and 11b are also aligned in the Y direction. The position of the optical pick-up 10 relative to the optical disc (D1, D2) is set so that the first focal line F1 will be parallel to the tangential line to the optical disc (D1, D2) when seen in the direction of the optical axis of the objective lens 20.

In the case where the spherical aberration is corrected for both the first and second optical discs D1 and D2 by adjusting the amount of the spherical aberration employing the diffraction lens structure as above, it is impossible to correct the coma for both optical discs. Therefore, the objective lens 20 is designed so that the sign of abaxial third order coma when the shorter wavelength laser beam L1 from the first laser diode 11a is focused on the first optical disc D1 will be opposite to the sign of abaxial third order coma when the longer wavelength laser beam L2 from the second laser diode 11b is focused on the second optical disc D2 in a virtual state in which the optical axis of the objective lens 20 coincides with the normal (normal line) to the optical disc (D1, D2).

When the above settings are employed, in the aforementioned virtual state, the coma becomes a negative coma when the first optical disc D1 is used, while the coma becomes a positive coma when the second optical disc D2 is used. From the virtual state, if the optical axis of the objective lens 20 is tilted relative to the normal to the optical disc (D1, D2), the comae for the optical discs D1 and D2 are corrected at different incident angles, by which it becomes possible to set both incident angles (of the laser beams L1 and L2 to the optical discs D1 and D2) within an allowable range (in which the coma is small enough) even if there exists a certain incident angle difference between the two laser beams of different wavelengths.

FIGS. 5A and 5B shows concrete examples of methods for tilting the optical axis of the objective lens 20 relative to the normal to the optical disc (D1, D2), in which only the first optical disc D1 is shown for the sake of simplicity. FIG. 5A shows an example in which the normal Ax1 of the first optical disc D1 is tilted relative to the optical axis Ax of the whole optical system (from the first and second laser diodes 11a and 11b to the objective lens 20), and FIG. 5B shows another example in which only the optical axis Ax2 of the objective lens 20 is tilted relative to the optical axis Ax of the optical system (coinciding with the normal to the first optical disc D1).

In the case of FIG. 5A where the coma is corrected by tilting the optical disc, the objective lens 20 satisfies the following condition (1):

$$-2.0 < SC_1/SC_2 < -0.5 \qquad (1)$$

where $SC_1$ denotes the offense against the sine condition (SC) at the peripheral area in the exclusive high NA area Rh when the shorter wavelength laser beam L1 is converged on the first optical disc D1, and $SC_2$ denotes the offense against the sine condition (SC) at the peripheral area in the common area Rc when the longer wavelength laser beam L2 is focused on the second optical disc D2.

Meanwhile, in the case of FIG. 5B where the coma is corrected by tilting the objective lens 20 only, the objective lens 20 satisfies the following condition (2):

$$-4.0 < SC_1/SC_2 < -1.0 \qquad (2)$$

The offense against the sine condition (SC) is defined by:

$$SC = nH_1/(n' \sin U') - f(1-m)$$

where n denotes the refractive index on the incident side, n' denotes the refractive index on the emerging side, U' denotes the angle between the emerging beam and the optical axis, m denotes the paraxial magnification, $H_1$ denotes the ray height on the principal plane, and f denotes the focal length.

The astigmatism has been corrected only in the direction along the first focal line F1 (Y direction) as mentioned above, therefore, if the optical pick-up is a finite optical system and the incident angle changes when the objective lens is moved in the radial direction of the optical disc (Z direction) by tracking servo, large astigmatism might occur and the wavefront aberration might exceed the allowable limit, by which it becomes impossible to ensure the stroke of the objective lens generally required for the tracking servo. In order to resolve the problem, the optical pick-up 10 of this embodiment is configured such that parallel light enters the objective lens 20 and the objective lens 20 is designed as an infinite conjugate type lens. Therefore, the incident angle does not change and no astigmatism is caused even when the objective lens 20 is moved in the radial direction of the optical disc by the tracking servo, by which the stroke for the tracking servo can be secured in a range in which the wavefront aberration does not exceed the allowable limit.

In the following, two concrete examples of the objective lens 20 based on the above embodiment will be presented.

EXAMPLE 1

FIG. 6 is a lens diagram showing an objective lens 20 as a first example and the optical discs (D1, D2). On the first surface 21 of the objective lens 20 of FIG. 6, the common area Rc satisfying $0 \leq h < 1.678$ (h: height (mm) from the optical axis) and the exclusive high NA area Rh satisfying $1.678 \leq h$ are provided with diffraction lens structures that are defined by different optical path difference functions. Further, the base curve (shape as a refracting lens excluding the diffraction lens structure) of the common area Rc and that of the exclusive high NA area Rh are formed as independent aspherical surfaces that are defined by separate coefficients. The second surface 22 of the objective lens 20 is a toric aspherical surface with no diffraction lens structure.

The shape of the base curve of the first surface 21 (rotationally symmetrical aspherical surface) is expressed by the following equation:

$$X(h) = \frac{Ch^2}{1 + \sqrt{1 - (1+K)C^2 h^2}} + A_4 h^4 + A_6 h^6 + A_8 h^8 + A_{10} h^{10} + A_{12} h^{12}$$

where, X(h) denotes the distance between a point on the aspherical surface whose height from the optical axis is h and a tangent plane to the aspherical surface on the optical axis (SAG amount), C denotes the curvature (1/r) of the aspherical surface on the optical axis, K denotes a conical coefficient, and $A_4$, $A_6$, $A_8$, $A_{10}$ and $A_{12}$ denote aspherical coefficients of the fourth, sixth, eighth, tenth and twelfth orders.

The shape of the second surface 22 (torica-spherical surface) is expressed by the following equation:

$$X(Y, Z) = \frac{(CyY^2 + CzZ^2)}{\sqrt{1 - (1+K)(Cy^2 Y^2 + Cz^2 Z^2)}} + A_4 h^4 + A_6 h^6 + A_8 h^8 + A_{10} h^{10} + A_{12} h^{12}$$

where, X(Y, Z) denotes the distance between a point on the toric aspherical surface having coordinates (Y, Z) (origin is set on the optical axis) and a tangent plane to the aspherical surface on the optical axis (SAG amount), Cy denotes the curvature of the aspherical surface in Y direction on the optical axis, Cz denotes the curvature of the aspherical surface in Z direction on the optical axis, K denotes a conical coefficient, $A_4$, $A_6$, $A_8$, $A_{10}$ and $A_{12}$ denote aspherical coefficients of the fourth, sixth, eighth, tenth and twelfth orders, and $h=\sqrt{Y^2+Z^2}$.

An additional optical path length provided by the diffraction lens structure can be expressed by an optical path difference function $\phi(h)$ which is defined as:

$$\phi(h)=(P_2h^2+P_4h^4+P_6h^6+\ldots)\times m\times \lambda$$

where, h denotes height from the optical axis, $P_n$ denotes an optical path difference function coefficient of the n-th order (n: even number), m denotes the order of diffraction, and $\lambda$ denotes the wavelength. The optical path difference function $\phi(h)$ indicates the difference between an optical path length of a virtual ray that is assumed not to be diffracted by the diffraction lens structure and an optical path length of a ray that is diffracted by the diffraction lens structure at a point on the diffracting plane whose height from the optical axis is h. The optical path difference function is a representation of a function of the diffraction lens by the additional amount of an optical path at the height h from the optical axis, the value of the optical path difference function being positive when the diffraction lens has a light diffusing function.

Actual fine configuration of the diffraction lens structure is determined by deleting components corresponding to integral multiples of the wavelength from the optical path length which is expressed by the above optical path difference function. Specifically, when the first order diffraction component is used, the width of each annular zone is set so that the optical path difference function at the inner radius of the annular zone will be different from that at the outer radius by one wavelength, and the level difference between adjacent annular zones are set so that an optical path difference of a wavelength will be given to the incident light.

Specifications of the objective lens 20 of the first example will be shown in the following TABLE 1, in which coefficients defining the base curve and the diffraction lens structure of the common area Rc of the first surface 21, coefficients defining the base curve and the diffraction lens structure of the exclusive high NA area Rh of the first surface 21, the surface interval, refractive indices for the working wavelengths (657 nm, 788 nm), and coefficients defining the aspherical shape of the second surface 22 are shown. In TABLE 1, $NA_1$, $f_1$ and $\lambda_1$ denote the numerical aperture, the focal length (mm) of the objective lens 20 including the diffraction lens structure, and the wavelength (mm) when the first optical disc D1 is used, and $NA_2$, $f_2$ and $\lambda_2$ denote the numerical aperture, the focal length (mm) of the objective lens 20 including the diffraction lens structure, and the wavelength (mm) when the second optical disc D2 is used. Incidentally, r denotes the paraxial curvature radius (mm), d denotes the interval (mm) between the first surface 21 and the second surface 22, and ry and rz denote the paraxial curvature radii (mm) of the toric aspherical surface in each principal meridian direction.

TABLE 1

| $NA_1$ = 0.60 | $f_1$ = 3.341 | $\lambda_1$ = 657 nm |
| $NA_2$ = 0.50 | $f_2$ = 3.358 | $\lambda_2$ = 788 nm |

FIRST SURFACE

COMMON AREA (0 < h < 1.678)
BASE CURVE

| r | 2.107 |

TABLE 1-continued

ASPHERICAL COEFFICIENTS

| $\kappa$ | −0.500 |
| $A_4$ | −2.35000 × 10⁻³ |
| $A_6$ | −1.88100 × 10⁻⁴ |
| $A_8$ | −9.74300 × 10⁻⁵ |
| $A_{10}$ | 2.98800 × 10⁻⁵ |
| $A_{12}$ | −6.50300 × 10⁻⁶ |

DIFFRACTION LENS STRUCTURE
ODF COEFFICIENTS

| $P_2$ | 0.00000 |
| $P_4$ | −1.77500 |
| $P_6$ | −1.31100 × 10⁻¹ |
| $P_8$ | 0.00000 |
| $P_{10}$ | 0.00000 |
| $P_{12}$ | 0.00000 |

EXCLUSIVE HIGH NA AREA (1.678 < h)
BASE CURVE

| r | 2.158 |

ASPHERICAL COEFFICIENTS

| $\kappa$ | −0.500 |
| $A_4$ | −3.88500 × 10⁻⁵ |
| $A_6$ | 4.21200 × 10⁻⁵ |
| $A_8$ | −8.70600 × 10⁻⁵ |
| $A_{10}$ | 2.37600 × 10⁻⁵ |
| $A_{12}$ | −4.64600 × 10⁻⁶ |

DIFFRACTION LENS STRUCTURE
ODF COEFFICIENTS

| $P_2$ | −4.61421 |
| $P_4$ | −6.62900 × 10⁻² |
| $P_6$ | −5.25500 × 10⁻² |
| $P_8$ | 0.00000 |
| $P_{10}$ | 0.00000 |
| $P_{12}$ | 0.00000 |
| d | 2.210 |

REFRACTIVE INDEX

| n657 | 1.54056 |
| n788 | 1.53657 |

SECOND SURFACE

| ry | −7.876 |
| rz | −7.873 |

ASPHERICAL COEFFICIENTS

| $\kappa$ | 0.00000 |
| $A_4$ | 1.50200 × 10⁻² |
| $A_6$ | −2.82500 × 10⁻³ |
| $A_8$ | 1.94200 × 10⁻⁴ |
| $A_{10}$ | −7.93000 × 10⁻⁷ |
| $A_{12}$ | −1.54700 × 10⁻⁷ |

In the composition of the first example, axial astigmatism takes on a value corresponding to a wavefront aberration of 0.012λ [rms], and the coma is corrected by the correction method of FIG. 5A by tilting the normal of the optical disc by 0.16° relative to the optical axis of the whole optical system. In this example, the offense against the sine condition $SC_1$ at the outer radius of the effective area (in the exclusive high NA area Rh) when the shorter wavelength laser beam L1 (657 nm) is converged on the first optical disc D1 is 0.0177 mm, and the offense against the sine condition $SC_2$ at the outer radius of the common area Rc when the longer wavelength laser beam L2 (788 nm) is converged on the second optical disc D2 is −0.0173 mm. In this case, $SC_1/SC_2$=−1.02 and the aforementioned conditions (1) and (2) are both satisfied; however, the ratio is close to the midpoint of the condition (1). Therefore, the design is suitable for the correction method of FIG. 5A tilting the normal of the optical disc relative to the optical axis of the whole optical system.

FIGS. 7A and 7B are graphs showing aberrations of the objective lens 20 of the first example for the first optical disc D1 at the wavelength of 657 nm, in which FIG. 7A shows the spherical aberration SA and the offense against the sine condition SC and FIG. 7B shows astigmatism when no axial astigmatism nor coma is given (DS: sagittal, DM: meridional).

The horizontal axis of each graph indicates the amount of each aberration in units of mm. The vertical axis of FIG. 7A indicates the NA and that of FIG. 7B indicates the image height Y in the Y direction.

FIG. 8 is a graph showing the relationship between the incident angle of the shorter wavelength laser beam L1 (emitted by the first laser diode 11a for the first optical disc D1) to the objective lens 20 and the wavefront aberration (rms) in the case where the axial astigmatism and the abaxial coma are introduced. The wavefront aberration has its minimum value when the incident angle is +0.5°. Let the allowable limit be 0.020λ, the wavefront aberration can be kept within the allowable limit in an incident angle range of 0.0° through +0.77°.

On the other hand, when no astigmatism nor coma is given to the objective lens 20, the wavefront aberration for the first optical disc D1 changes as the solid line shown in FIG. 9, in which the wavefront aberration reaches the allowable limit 0.020λ at ±0.48° (allowable incident angle range: −0.48° through +0.48°). When only the astigmatism is introduced, the wavefront aberration changes as the broken line shown in FIG. 9, by which the allowable incident angle range (in which the wavefront aberration can be kept within the allowable limit) is widened to −0.55° through +0.55° even though the minimum value of the wavefront aberration increases.

As above, by widening the allowable incident angle range (by introducing the axial astigmatism) and by introducing the coma, the range is shifted to a direction with reference to the incident angle 0° (to the positive side in this example).

FIGS. 10A and 10B are graphs showing aberrations of the objective lens 20 of the first example for the second optical disc D2 at the wavelength of 788 nm, in which FIG. 10A shows the spherical aberration SA and the offense against the sine condition SC and FIG. 10B shows astigmatism when no axial astigmatism nor coma is given (DS: sagittal, DM: meridional). In FIG. 10A, the offense against the sine condition SC for the second optical disc D2 has a sign opposite to that of the offense against the sine condition SC for the first optical disc D1 which has been shown in FIG. 7A.

FIG. 11 is a graph showing the relationship between the incident angle of the longer wavelength laser beam L2 (emitted by the second laser diode 11b for the second optical disc D2) to the objective lens 20 and the wavefront aberration (rms) in the case where the axial astigmatism and the abaxial coma are introduced. The wavefront aberration has its minimum value when the incident angle is −0.6°. Let the allowable limit be 0.020λ, the wavefront aberration can be kept within the allowable limit in an incident angle range of −1.1° through +0.18°.

On the other hand, when no astigmatism nor coma is given to the objective lens 20, the wavefront aberration for the second optical disc D2 changes as the solid line shown in FIG. 12, in which the wavefront aberration reaches the allowable limit 0.020λ at ±0.75° (allowable incident angle range: −0.75° through +0.75°). When only the astigmatism is introduced, the wavefront aberration changes as the broken line shown in FIG. 12, by which the allowable incident angle range (in which the wavefront aberration can be kept within the allowable limit) is widened to −0.80° through +0.80° even though the minimum value of the wavefront aberration increases.

As above, by widening the allowable incident angle range (by introducing the axial astigmatism) and by introducing the coma, the range is shifted to a direction with reference to the incident angle 0° (to the negative side in this example).

Here, usable ranges of the incident angle to the objective lens 20 will be discussed assuming that the interval between the light emitting points is 400 μm and the focal length of the collimating lens 12 is 23 mm. In such settings, the incident angle to the objective lens 20 varies approximately 1° between the two laser beams of different wavelengths, that is, an incident angle difference of approximately 1° occurs between the two laser beams. FIG. 13 explains the difference of the allowable incident angle ranges between the objective lens of the first example and an objective lens as a comparative example which is designed similarly to the first example with no astigmatism nor coma introduced thereto.

In the comparative example at the top of FIG. 13, the allowable incident angle range for the first optical disc D1 is −0.48° through +0.48°, and that for the second optical disc D2 is −0.75° through +0.75°. In order to keep the wavefront aberration within the allowable limit for each optical disc maintaining the aforementioned incident angle difference (1°) between the two laser beams, the incident angles have to be set according to the setting #1 or setting #2 in the following table 2.

TABLE 2

|  | setting #1 | setting #2 |
| --- | --- | --- |
| first disc | −0.25 − +0.48 | −0.48 − +0.25 |
| second disc | −0.75 − −0.52 | +0.52 − +0.75 |

In both settings #1 and #2, each incident angle has to be set in a narrow usable range of 0.23°, by which high accuracy is required for the positioning/setting of the laser module 11. Further, each usable range in the settings #1 and #2 is located on the periphery of the allowable incident angle range where the wavefront aberration is relatively large, therefore, slight change or error in environmental conditions or optical system's settings might disable the laser beam from focusing on the optical disc in a preset spot diameter.

On the other hand, in the first example at the bottom of FIG. 13, the allowable incident angle range for the first optical disc D1 is 0.00° through +0.77°, and that for the second optical disc D2 is −1.1° through +0.18°. In the case where the incident angle difference is 1°, the incident angle to the second optical disc D2 can successfully be set in its allowable range even if the incident angle to the first optical disc D1 is arbitrarily set in its allowable range. Therefore, the usable range of the incident angle is 0.00° through +0.77° for the first optical disc D1 and −1.0° through −0.23° for the second optical disc D2. The width of each usable range in the first example is more than three times the width in the comparative example, therefore, the laser module 11 can be set without the need of precise positioning. Further, the incident angle can be set in the central part of the allowable incident angle range for each optical disc, by which tolerance to manufacturing error of other optical elements, assembly error, etc. can be increased.

EXAMPLE 2

FIG. 14 is a lens diagram showing an objective lens 20 as a second example and the optical disc (D1, D2). Specifications of the objective lens 20 of the second example will be shown in Table. 3. On the first surface 21 of the objective lens 20 of FIG. 14, the common area Rc satisfying $0 \leq h < 1.68$ (h: height (mm) from the optical axis) and the exclusive high NA area Rh satisfying $1.68 \leq h$ are provided with diffraction lens structures that are defined by different optical path difference functions. Further, the base curve (shape as a refracting lens excluding the diffraction lens structure) of the common area Rc and that of the exclusive high NA area Rh are formed as independent aspherical surfaces that are defined by separate coefficients. On the other hand, the second surface 22 of the objective lens 20 is a toric aspherical surface with no diffraction lens structure.

In the table 3, coefficients defining the base curve and the diffraction lens structure of the common area Rc of the first surface 21, coefficients defining the base curve and the diffraction lens structure of the exclusive high NA area Rh of the first surface 21, the surface interval, refractive indices for the working wavelengths (657 nm, 788 nm), and coefficients defining the aspherical shape of the second surface 22 are shown.

TABLE 3

| $NA_1 = 0.60$ | $f_1 = 3.334$ | $\lambda_1 = 657$ nm |
|---|---|---|
| $NA_2 = 0.50$ | $f_2 = 3.358$ | $\lambda_2 = 788$ nm |

FIRST SURFACE

COMMON AREA (0 < h < 1.680)
BASE CURVE

| r | 2.112 |
|---|---|
| ASPHERICAL COEFFICIENTS | |
| $\kappa$ | $-0.500$ |
| $A_4$ | $-2.34600 \times 10^{-3}$ |
| $A_6$ | $-1.48900 \times 10^{-4}$ |
| $A_8$ | $-1.04500 \times 10^{-4}$ |
| $A_{10}$ | $3.16400 \times 10^{-5}$ |
| $A_{12}$ | $-6.78000 \times 10^{-6}$ |

DIFFRACTION LENS STRUCTURE
ODF coefficients

| $P_2$ | 0.00000 |
|---|---|
| $P_4$ | $-1.74000$ |
| $P_6$ | $-1.40400 \times 10^{-1}$ |
| $P_8$ | 0.00000 |
| $P_{10}$ | 0.00000 |
| $P_{12}$ | 0.00000 |

EXCLUSIVE HIGH NA AREA (1.680 < h)
BASE CURVE

| r | 2.130 |
|---|---|
| ASPHERICAL COEFFICIENTS | |
| $\kappa$ | $-0.500$ |
| $A_4$ | $-1.58000 \times 10^{-3}$ |
| $A_6$ | $1.48000 \times 10^{-4}$ |
| $A_8$ | $-2.35000 \times 10^{-4}$ |
| $A_{10}$ | $6.25700 \times 10^{-5}$ |
| $A_{12}$ | $-9.08500 \times 10^{-6}$ |

DIFFRACTION LENS STRUCTURE
ODF COEFFICIENTS

| $P_2$ | $-1.664562$ |
|---|---|
| $P_4$ | $-1.06400$ |
| $P_6$ | $-1.28040 \times 10^{-1}$ |
| $P_8$ | 0.00000 |
| $P_{10}$ | 0.00000 |
| $P_{12}$ | 0.00000 |
| d | 2.220 |

REFRACTIVE INDEX

| n657 | 1.54056 |
|---|---|
| n788 | 1.53657 |

TABLE 3-continued

SECOND SURFACE

| ry | $-7.760$ |
|---|---|
| rz | $-7.757$ |
| ASPHERICAL COEFFICIENTS | |
| $\kappa$ | 0.00000 |
| $A_4$ | $1.51900 \times 10^{-2}$ |
| $A_6$ | $-2.59200 \times 10^{-3}$ |
| $A_8$ | $1.23900 \times 10^{-4}$ |
| $A_{10}$ | $-1.03700 \times 10^{-5}$ |
| $A_{12}$ | $1.53600 \times 10^{-6}$ |

In the composition of the second example, axial astigmatism takes on a value corresponding to a wavefront aberration of $0.012\lambda$ [rms], and the coma is corrected by the correction method of FIG. 5B by tilting the optical axis of the objective lens 20 by 0.16° relative to the optical axis of the optical system (coinciding with the normal of the first optical disc D1). In this example, the offense against the sine condition $SC_1$ at the outer radius of the effective area when the shorter wavelength laser beam L1 (657 nm) is focused on the first optical disc D1 is 0.0243 mm, and the offense against the sine condition $SC_2$ at the outer radius of the common area Rc when the longer wavelength laser beam L2 (788 nm) is focused on the second optical disc D2 is $-0.0132$ mm. In this case, $SC_1/SC_2 = -1.84$ and the aforementioned conditions (1) and (2) are both satisfied; however, the ratio is close to the midpoint of the condition (2). Therefore, the design is suitable for the correction method of FIG. 5B tilting the optical axis of the objective lens 20 by 0.16° relative to the optical axis of the optical system coinciding with the normal of the first optical disc D1.

FIGS. 15A and 15B are graphs showing aberrations of the objective lens 20 of the second example for the first optical disc D1 at the wavelength of 657 nm, in which FIG. 15A shows the spherical aberration SA and the offense against the sine condition SC and FIG. 15B shows astigmatism when no axial astigmatism nor coma is given (DS: sagittal, DM: meridional).

FIG. 16 is a graph showing the relationship between the incident angle of the shorter wavelength laser beam L1 (emitted by the first laser diode 11a for the first optical disc D1) to the objective lens 20 and the wavefront aberration (rms) in the case where the axial astigmatism and the abaxial coma are introduced. The wavefront aberration has its minimum value when the incident angle is −0.55°. Let the allowable limit be $0.020\lambda$, the wavefront aberration can be kept within the allowable limit in an incident angle range of −0.80° through −0.20°.

On the other hand, when no astigmatism nor coma is given to the objective lens 20, the wavefront aberration for the first optical disc D1 changes as the solid line shown in FIG. 17, in which the wavefront aberration reaches the allowable limit $0.020\lambda$ at ±0.38° (allowable incident angle range: −0.38° through +0.38°). When only the astigmatism is introduced, the wavefront aberration changes as the broken line shown in FIG. 17, by which the allowable incident angle range (for keeping the wavefront aberration within the allowable limit) is widened to −0.40° through +0.40° even though the minimum value of the wavefront aberration increases.

As above, by widening the allowable incident angle range (by introducing the axial astigmatism) and by introducing the coma, the range is shifted to a direction with reference to the incident angle 0° (to the negative side in this example).

FIGS. 18A and 18B are graphs showing aberrations of the objective lens 20 of the second example for the second optical disc D2 at the wavelength of 788 nm, in which FIG. 18A shows the spherical aberration SA and the offense against the sine condition SC and FIG. 18B shows astigmatism when no axial astigmatism nor coma is given (DS: sagittal, DM: meridional). In FIG. 18A, the offense against the sine condition SC for the second optical disc D2 has a sign opposite to that of the offense against the sine condition SC for the first optical disc D1 which has been shown in FIG. 15A.

FIG. 19 is a graph showing the relationship between the incident angle of the longer wavelength laser beam L2 (emitted by the second laser diode 11b for the second optical disc D2) to the objective lens 20 and the wavefront aberration (rms) in the case where the axial astigmatism and the abaxial coma are introduced. The wavefront aberration has its minimum value when the incident angle is +0.48°. Let the allowable limit be 0.020λ, the wavefront aberration can be kept within the allowable limit in an incident angle range of −0.70° through +1.1°.

On the other hand, when no astigmatism nor coma is given to the objective lens 20, the wavefront aberration for the second optical disc D2 changes as the solid line shown in FIG. 20, in which the wavefront aberration reaches the allowable limit 0.020λ at ±0.96° (allowable incident angle range: −0.96° through +0.96°). When only the astigmatism is introduced, the wavefront aberration changes as the broken line shown in FIG. 20, by which the allowable incident angle range (for keeping the wavefront aberration within the allowable limit) is widened to −1.1° through +1.1° even though the minimum value of the wavefront aberration increases.

As above, by widening the allowable incident angle range (by introducing the axial astigmatism) and by introducing the coma, the range is shifted to a direction with reference to the incident angle 0° (to the positive side in this example).

Also by the above composition of the second example, a wide allowable range can be secured for the incident angle in the case where a certain incident angle difference exists between the two laser beams of different wavelengths similarly to the first example, therefore, the laser module 11 can be set without the need of precise positioning. The incident angle can be set in the central part of the allowable incident angle range for each optical disc, by which tolerance to manufacturing error of other optical elements, assembly error, etc. can be increased.

Incidentally, while the astigmatism is provided in the above examples by designing the second surface 22 of the objective lens 20 as a toric aspherical surface, when the objective lens 20 is manufactured by injection molding, the astigmatism can also be provided by properly adjusting the molding conditions, while giving rotational symmetry to the surface in design. For example, the astigmatism can be added to the objective lens 20 by adjusting the distribution of mold temperature, resin temperature, and the like.

While the present invention has been described with reference to the particular illustrative embodiments, it is not to be restricted by those embodiments but only by the appended claims. It is to be appreciated that those skilled in the art can change or modify the embodiments without departing from the scope of the present invention.

The present disclosure relates to the subject matter contained in Japanese Patent Application No. 2002-100398, filed on Apr. 2, 2002, which is expressly incorporated herein by reference in its entirety.

What is claimed is:

1. An objective lens of an optical pick-up which converges a shorter wavelength laser beam on a first optical disc having a thin cover layer and high data density and converges a longer wavelength laser beam on a second optical disc having a thick cover layer and low data density, wherein said objective lens is configured to provide axial astigmatism corresponding to wavefront aberration of 0.01λ [rms] or more when the shorter wavelength laser beam is converged on the first optical disc, and to provide abaxial third order coma so that a sign thereof when the shorter wavelength laser beam is converged on the first optical disc will be opposite to the sign thereof when the longer wavelength laser beam is converged on the second optical disc, in a virtual state in which the optical axis of said objective lens coincides with the normal to the optical disc.

2. The objective lens according to claim 1, wherein said objective lens is configured as an infinite conjugate type lens which converges the shorter and longer wavelength laser beams incident, as parallel light, on said objective lens on the first and second optical discs, respectively.

3. The objective lens according to claim 1, wherein said objective lens is formed by a single lens element whose one surface is provided with a diffraction lens structure having annular zones which is formed so that spherical aberration provided by said diffraction lens structure will have wavelength dependency such that the spherical aberration changes in an undercorrected direction as the wavelength is longer.

4. An optical pick-up comprising:
a first laser diode which emits a shorter wavelength laser beam;
a second laser diode which emits a longer wavelength laser beam, whose light emitting point is placed in the vicinity of that of said first laser diode; and
an objective lens which converges the shorter wavelength laser beam emitted by said first laser diode on a first optical disc having a thinner cover layer and high data density and converges the longer wavelength laser beam emitted by said second laser diode on a second optical disc having a thicker cover layer and low data density,
wherein said objective lens is configured to provide axial astigmatism corresponding to wavefront aberration of 0.01λ [rms] or more when the shorter wavelength laser beam is converged on the first optical disc, and to provide abaxial third order coma so that a sign thereof when the shorter wavelength laser beam is converged on the first optical disc will be opposite to the sign thereof when the longer wavelength laser beam is converged on the second optical disc, in a virtual state in which the optical axis of said objective lens coincides with the normal of the optical disc,
wherein said objective lens being an anamorphic lens which forms two focal lines when either of the first and second laser beams is incident on said objective lens,
wherein light emitting points of said first and second laser diodes are arranged so that light converging points of the laser beams emitted by said first and second laser diodes are aligned in a direction parallel to one of the two focal lines formed nearer to said objective lens when parallel light is incident on said objective lens in the direction of the optical axis of the optical system of said optical pick-up, and
wherein the optical axis of said objective lens is tilted relative to the normal to the optical disc in a plane including said focal line nearer to said objective lens.

5. The optical pick-up according to claim 4, wherein said objective lens is formed as an infinite conjugate type lens which converges the shorter and longer wavelength laser beams, incident as parallel light on said objective lens, on the first and second optical discs, respectively.

6. The optical pick-up according to claim 4, wherein said objective lens is formed by a single lens element whose one surface is provided with a diffraction lens structure having annular zones which is formed so that spherical aberration caused by said diffraction lens structure will have wavelength dependency such that the spherical aberration changes in an undercorrected direction as the wavelength is longer.

7. The optical pick-up according to claim 4, wherein the coma is corrected by tilting the optical axis of the whole optical system from said first and second laser diodes to said objective lens relative to the normal of the optical disc.

8. The optical pick-up according to claim 7, wherein the following relationship is satisfied in a virtual state in which the optical axis of said objective lens coincides with the normal to the optical disc:

$$-2.0 < SC_1/SC_2 < -0.5$$

wherein, $SC_1$ denotes offense against the sine condition SC at the outer radius of an effective area when the shorter wavelength laser beam is converged on the first optical disc, $SC_2$ denotes the offense against the sine condition SC at the outer radius of a common area, which is defined as an area of said objective lens through which light corresponding an NA necessary and sufficient for the second optical disc passes, when the longer wavelength laser beam is converged on the second optical disc, and the offense against the sine condition SC is defined as:

$$SC = nH_1/(n' \sin U') - f(1-m)$$

wherein, n denotes the refractive index on the incident side, n' denotes the refractive index on the emerging side, U' denotes the angle between the emerging beam and the optical axis, m denotes the paraxial magnification, $H_1$ denotes the ray height on the principal plane, and f denotes the focal length.

9. The optical pick-up according to claim 4, wherein the coma is corrected by tilting the optical axis of said objective lens relative to the normal of the optical disc coinciding with the optical axis of the optical system excluding said objective lens.

10. The optical pick-up according to claim 9, wherein the following relationship is satisfied in a virtual state in which the optical axis of said objective lens coincides with the normal to the optical disc:

$$-4.0 < SC_1/SC_2 < -1.0$$

wherein, $SC_1$ denotes offense against the sine condition SC at the outer radius of an effective area when the shorter wavelength laser beam is converged on the first optical disc, $SC_2$ denotes the offense against the sine condition SC at the outer radius of a common area, which is defined as an area of said objective lens through which light corresponding an NA necessary and sufficient for the second optical disc passes, when the longer wavelength laser beam is converged on the second optical disc, and the offense against the sine condition SC is defined as:

$$SC = nH_1/(n' \sin U') - f(1-m)$$

wherein, n denotes the refractive index on the incident side, n' denotes the refractive index on the emerging side, U' denotes the angle between the emerging beam and the optical axis, m denotes the paraxial magnification, $H_1$ denotes the ray height on the principal plane, and f denotes the focal length.

11. The optical pick-up according to claim 4, wherein said first and second laser diodes are built in one package.

12. An optical disc device, comprising:
a spindle motor which spins an optical disc;
an optical pick-up; and
a driving mechanism which slides at least part of said optical pick-up in the radial direction of the optical disc,
said optical pick-up including:
a first laser diode which emits a shorter wavelength laser beam;
a second laser diode which emits a longer wavelength laser beam, whose light emitting point is placed in the vicinity of that of said first laser diode; and
an objective lens which converges the shorter wavelength laser beam emitted by said first laser diode on a first optical disc having a thin cover layer and high data density and converges the longer wavelength laser beam emitted by said second laser diode on a second optical disc having a thick cover layer and low data density,
wherein said objective lens is formed to provide axial astigmatism corresponding to wavefront aberration of 0.01λ [rms] or more when the shorter wavelength laser beam is converged on the first optical disc, and to provide abaxial third order coma so that its sign when the shorter wavelength laser beam is converged on the first optical disc will be opposite to its sign when the longer wavelength laser beam is converged on the second optical disc in a virtual state in which the optical axis of said objective lens coincides with the normal of the optical disc,
wherein said objective lens being an anamorphic lens forming two focal lines;
wherein light emitting points of said first and second laser diodes are arranged so that focal points formed by the laser beams emitted by said first and second laser diodes will be aligned in a direction parallel to one of the two focal lines formed nearer to said objective lens when parallel light is incident on said objective lens in the direction of the optical axis of the optical system of said optical pick-up,
wherein the optical axis of said objective lens is tilted relative to the normal of the optical disc in a plane including said focal line nearer to said objective lens, and
wherein the position of said optical pick-up relative to the optical disc is set so that said focal line nearer to said objective lens will be parallel to a tangential line to the optical disc when seen in the direction of the optical axis of said objective lens.

13. The optical disc device according to claim 12, wherein said objective lens is formed as an infinite conjugate type lens which converges the shorter and longer wavelength laser beams, incident as parallel light on said objective lens, on the first and second optical discs, respectively.

14. The optical disc device according to claim 12, wherein said objective lens is formed by a single lens whose one surface is provided with a diffraction lens structure having annular zones which is formed so that spherical aberration caused by said diffraction lens structure will have wavelength dependency such that the spherical aberration changes in an undercorrected direction as the wavelength is longer.

15. The optical disc device according to claim 12, wherein the coma is corrected by tilting the optical axis of the whole optical system from said first and second laser diodes to said objective lens relative to the normal of the optical disc.

16. The optical disc device according to claim 15, wherein the following relationship is satisfied in a virtual state in which the optical axis of said objective lens coincides with the normal of the optical disc:

$$-2.0 < SC_1/SC_2 < -0.5$$

wherein, $SC_1$ denotes offense against the sine condition SC at the outer radius of an effective area when the shorter wavelength laser beam is converged on the first optical disc, $SC_2$ denotes the offense against the sine condition SC at the outer radius of a common area, which is defined as an area of said objective lens through which light corresponding an NA necessary and sufficient for the second optical disc passes, when the longer wavelength laser beam is converged on the second optical disc, and the offense against the sine condition SC is defined as:

$$SC = nH_1/(n' \sin U') - f(1-m)$$

wherein, n denotes the refractive index on the incident side, n' denotes the refractive index on the emerging side, U' denotes the angle between the emerging beam and the optical axis, m denotes the paraxial magnification, $H_1$ denotes the ray height on the principal plane, and f denotes the focal length.

17. The optical disc device according to claim 12, wherein the coma is corrected by tilting the optical axis of said objective lens relative to the normal of the optical disc coinciding with the optical axis of the optical system excluding said objective lens.

18. The optical disc device according to claim 17, wherein the following relationship is satisfied in a virtual state in which the optical axis of said objective lens coincides with the normal of the optical disc:

$$-4.0 < SC_1/SC_2 < -1.0$$

wherein, $SC_1$ denotes offense against the sine condition SC at the outer radius of an effective area when the shorter wavelength laser beam is converged on the first optical disc, $SC_2$ denotes the offense against the sine condition SC at the outer radius of a common area, which is defined as an area of said objective lens through which light corresponding an NA necessary and sufficient for the second optical disc passes, when the longer wavelength laser beam is converged on the second optical disc, and the offense against the sine condition SC is defined as:

$$SC = nH_1/(n' \sin U') - f(1-m)$$

wherein, n denotes the refractive index on the incident side, n' denotes the refractive index on the emerging side, U' denotes the angle between the emerging beam and the optical axis, m denotes the paraxial magnification, $H_1$ denotes the ray height on the principal plane, and f denotes the focal length.

19. The optical disc device according to claim 12, wherein said first and second laser diodes are built in one package.

* * * * *